United States Patent
Cherian et al.

(10) Patent No.: US 9,900,799 B2
(45) Date of Patent: Feb. 20, 2018

(54) REVERSE LINK CONTROL TO REDUCE FORWARD LINK LATENCY

(75) Inventors: George Cherian, San Diego, CA (US); Linhai He, San Diego, CA (US); Donna Ghosh, San Diego, CA (US); Christopher Gerard Lott, San Diego, CA (US); Rashid Ahmed Akbar Attar, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 601 days.

(21) Appl. No.: 13/210,519

(22) Filed: Aug. 16, 2011

(65) Prior Publication Data

US 2013/0044599 A1  Feb. 21, 2013

(51) Int. Cl.
*H04W 28/02* (2009.01)
*H04L 12/851* (2013.01)

(52) U.S. Cl.
CPC ..... *H04W 28/0205* (2013.01); *H04L 47/2433* (2013.01)

(58) Field of Classification Search
CPC ........................ H04W 28/0205; H04L 47/2433
USPC ........................................ 370/235, 329, 230
See application file for complete search history.

(56) References Cited

U.S. PATENT DOCUMENTS

| | | | |
|---|---|---|---|
| 6,125,110 A | 9/2000 | Proctor et al. | |
| 6,282,172 B1 | 8/2001 | Robles et al. | |
| 7,359,326 B1* | 4/2008 | Harper | H04L 1/0086 370/235 |
| 8,467,401 B1* | 6/2013 | Zhang | 370/412 |
| 2003/0031203 A1 | 2/2003 | Fukui | |
| 2004/0085915 A1 | 5/2004 | Gronau et al. | |
| 2005/0041669 A1* | 2/2005 | Cansever et al. | 370/395.21 |
| 2005/0220040 A1 | 10/2005 | Petrovic et al. | |
| 2005/0271048 A1* | 12/2005 | Casey | H04L 12/5695 370/389 |
| 2007/0053290 A1* | 3/2007 | Michels | 370/230 |
| 2008/0008159 A1* | 1/2008 | Bourlas et al. | 370/352 |

(Continued)

FOREIGN PATENT DOCUMENTS

| | | |
|---|---|---|
| CN | 1705308 A | 12/2005 |
| CN | 101964758 A | 2/2011 |

(Continued)

OTHER PUBLICATIONS

International Search Report and Written Opinion—PCT/US2012/051205—ISA/EPO—dated Dec. 3, 2012.

*Primary Examiner* — Brandon Renner
*Assistant Examiner* — Mandish Randhawa
(74) *Attorney, Agent, or Firm* — Arent Fox, LLP

(57) ABSTRACT

Some implementations provide a method for prioritizing reverse link packets so that particular reverse link packets are transmitted with a reduced latency in order to improve spectral efficiency of the forward link. The method also optionally includes weighting packets according to their determined lengths, and transmitting packets based on the determined weights. In one implementation, the method includes sorting packets at least according to one of size, type and nature of the data in the packets. Accordingly, sorting of the packets includes at least one of determining the size and the type of each packet. In one implementation, sorting the packets includes deep-packet inspection to determine a respective priority value for each packet.

94 Claims, 12 Drawing Sheets

(56) References Cited

U.S. PATENT DOCUMENTS

| | | | |
|---|---|---|---|
| 2008/0080464 A1 | 4/2008 | Speight | |
| 2009/0080451 A1 | 3/2009 | Gogic | |
| 2010/0067401 A1* | 3/2010 | Medvedev et al. | 370/253 |
| 2010/0080153 A1 | 4/2010 | Kahn et al. | |
| 2010/0135232 A1* | 6/2010 | Fan et al. | 370/329 |
| 2010/0250733 A1* | 9/2010 | Turanyi et al. | 709/224 |
| 2010/0325299 A1* | 12/2010 | Rao et al. | 709/230 |
| 2011/0019575 A1* | 1/2011 | Croot et al. | 370/252 |
| 2012/0057462 A1* | 3/2012 | Kotecha et al. | 370/236 |
| 2012/0106342 A1* | 5/2012 | Sundararajan | H04L 47/193 370/235 |
| 2012/0284372 A1* | 11/2012 | Ghosh et al. | 709/219 |

FOREIGN PATENT DOCUMENTS

| | | |
|---|---|---|
| EP | 1416683 A1 | 5/2004 |
| JP | H11513869 A | 11/1999 |
| JP | 2007266753 A | 10/2007 |
| JP | 2008536356 A | 9/2008 |
| WO | WO-9716040 A1 | 5/1997 |
| WO | 02056631 A1 | 7/2002 |
| WO | 2008156382 A1 | 12/2008 |

\* cited by examiner

REVERSE LINK CONTROL TO REDUCE FORWARD LINK LATENCY

BACKGROUND

Field

The present application relates to wireless systems, and more specifically to systems, methods and apparatus configured to enable management of wireless resources.

Background

Wireless communication systems are widely deployed to provide various types of communication content such as voice, data, and so on. These systems may be multiple-access systems capable of supporting communication with multiple users by sharing the available system resources (e.g., bandwidth and transmit power). The popularity of high-rate wireless data services is increasing the demand for access to available frequency spectrum. The ability to satisfy the demand is often limited by a lack of available frequency spectrum that may be used for reliable communications within a geographic area.

For services involving multiple processing devices, such as computers and the like, a communication protocol is frequently used to exchange data between devices. Various communication protocols have been standardized over time to allow an application in a processing device that supports a specific standard to communicate freely with an application in another processing device supporting the same standard.

The TCP/IP (Transmission Control Protocol/Internet Protocol) suite is generally considered the most common set of communication protocols. Various network layer protocols exist within the TCP/IP suite, some of which accommodate mobility. A protocol that accommodates mobility allows an access terminal to maintain a network layer connection even while it leaves an area serviced by one radio network access gateway to an area serviced by another radio network access gateway.

However, the foundation of the TCP/IP suite was initially designed for wire-line and optical networks, in which available communication channels are not limited to the same extent as they are in wireless networks. As a result there are numerous inefficiencies created by employing the TCP/IP suite in wireless networks.

SUMMARY

Various embodiments of systems, methods and devices within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various implementations are used to manage air-link connections in combination with client-server application messaging.

One aspect of the disclosure is a method of managing air-link connection. In some implementations, the method includes determining a respective priority for one or more reverse link packets, wherein the respective priority for a reverse link packet is based on at least the estimated impact of the delay in sending the reverse link packet on a corresponding forward link; and transmitting reverse link packets based on at least the determined priority for the reverse link packets. In some implementations, the estimated impact includes at least one of an estimate of the amount of time the forward link may be idle, an estimate of the likelihood that the forward link may be idle, and an estimated measure of the underutilization of the forward link.

In some implementation, the method also includes receiving an indicator of a measure of a reverse link data rate; and determining the priorities for the packets based at least in part on the indicator of the reverse link data rate. In some implementations, the method also includes comparing the indicator to a threshold value. In some implementations, the threshold includes a lower bound, below which an access terminal can expect lower than nominal data rates on the reverse link to an access point. In some implementations, the threshold is an upper bound, above which an access terminal can expect lower than nominal data rates on the reverse link to an access point. In some implementations, the method also includes transmitting unsorted packets when the indicator does not breach the threshold value. In some implementations, the method also includes determining at least one of the packet, type of the packet and the nature of the data included in the packet, wherein the estimated impact is based at least on one of the size of the packet, type of the packet and the nature of the data included in the packet.

In some implementations, determining a respective priority for one or more reverse link packets includes: determining the length of a packet; and prioritizing the packet based at least on the determined length. In some implementations, prioritization based on at least on the determined length includes favoring packets below a particular length threshold.

In some implementations, the method also includes determining the type of a packet; and prioritizing the packet based at least on the determined type. In some implementations, prioritization based on at least on the determined type includes favoring particular types. In some implementations, determining a respective priority for one or more reverse link packets includes: determining the nature of the data included in the packet; and prioritizing the packet based at least on the determined nature of the data. In some implementations, determining the nature of the data includes deep-packet inspection of the packet. In some implementations, prioritization based on at least on the determined nature of the data includes favoring particular types of data. In some implementations, GET packets for advertising information are given a low priority. In some implementations, DNS packets are given a relatively high priority.

In some implementations, determining a respective priority for one or more reverse link packets includes: determining whether the packet is related to a foreground or background application; and prioritizing the packet based at least on whether the packet is related to a foreground or background application. In some implementations, determining whether the packet is related to a foreground or background application is based at least in part on information from an operating system managing applications on an access terminal.

In some implementations, the method also includes sorting prioritized packets into respective queues for corresponding priority levels; setting at least one frequency of service value for each priority level; and servicing the respective queues based at least on the corresponding frequency of service value for the respective priority level. In some implementations, at least one frequency of service value is based on a particular priority level and an indicator of the reverse link data rate. In some implementations, the priority levels are rank based at least on one of the estimated impact includes at least one of an estimate of the amount of time the forward link may be idle, an estimate of the likelihood that the forward link may be idle, and an estimated measure of the underutilization of the forward link.

Another aspect of the disclosure is computer program product for managing air-link connections including a computer readable medium comprising instructions that when executed cause an apparatus to determine a respective priority for one or more reverse link packets, wherein the respective priority for a reverse link packet is based on at least the estimated impact of the delay in sending the reverse link packet on a corresponding forward link; and transmit reverse link packets based on at least the determined priority for the reverse link packets.

Another aspect of the disclosure is an apparatus configured to manage air-link connections. In some implementations, the apparatus includes means for determining a respective priority for one or more reverse link packets, wherein the respective priority for a reverse link packet is based on at least the estimated impact of the delay in sending the reverse link packet on a corresponding forward link; and, means for transmitting reverse link packets based on at least the determined priority for the reverse link packets.

Another aspect of the disclosure is an apparatus configured to manage air-link connections. In some implementations, the apparatus includes a controller configured to determine a respective priority for one or more reverse link packets, wherein the respective priority for a reverse link packet is based on at least the estimated impact of the delay in sending the reverse link packet on a corresponding forward link; and, transmit reverse link packets based on at least the determined priority for the reverse link packets.

BRIEF DESCRIPTION OF THE DRAWINGS

So that the manner in which features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

Figure 1:
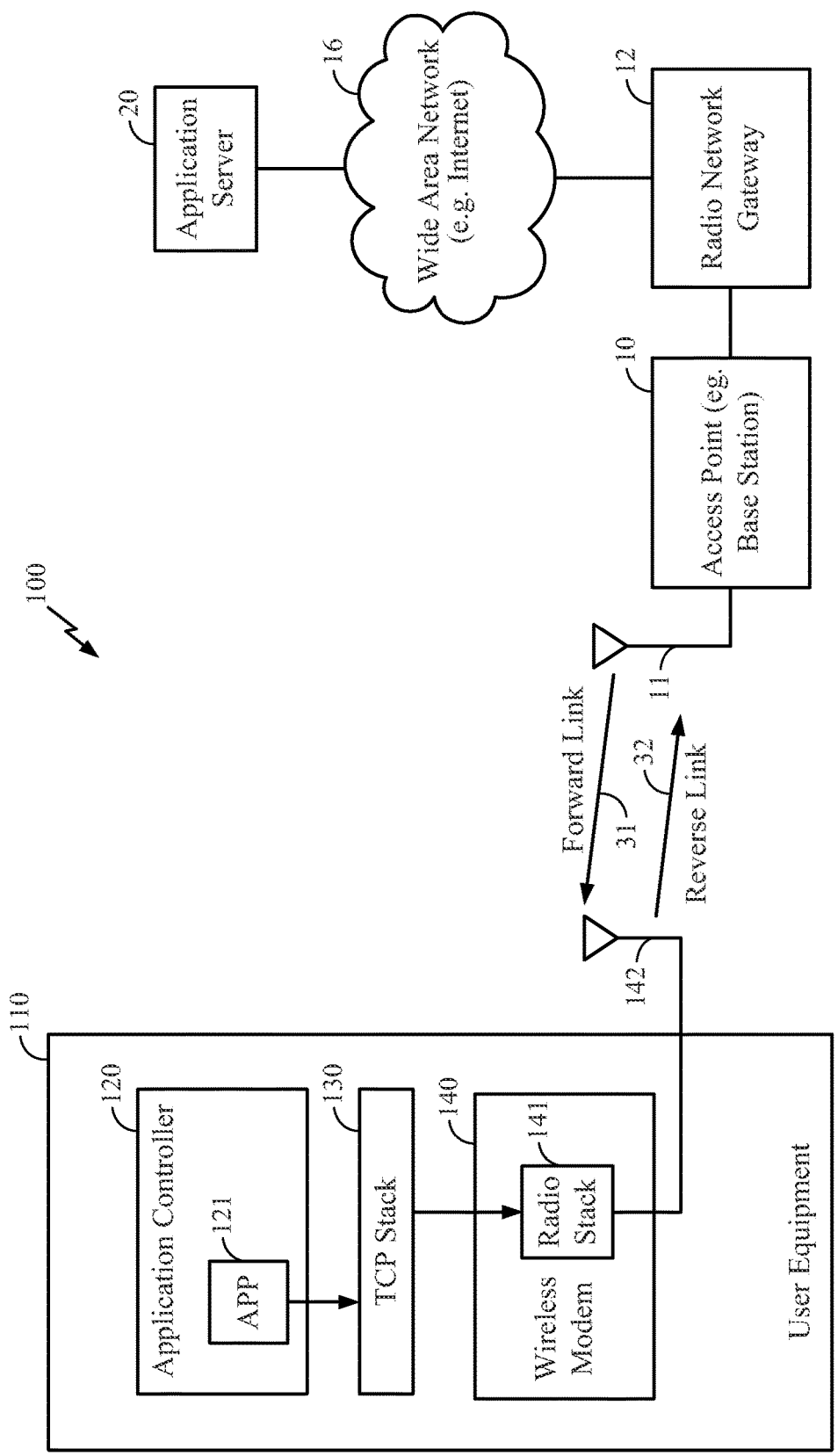
FIG. 1 is a simplified block diagram of a portion of a communication system.

In accordance with common practice the various features illustrated in the drawings may not be drawn to scale. Accordingly, the dimensions of the various features may be arbitrarily expanded or reduced for clarity. In addition, some of the drawings may not depict some of the components of a given system, method or device. Finally, like reference numerals may be used to denote like features throughout the specification and figures.

DETAILED DESCRIPTION

Various aspects of embodiments within the scope of the appended claims are described below. It should be apparent that the aspects described herein may be embodied in a wide variety of forms and that any specific structure and/or function described herein is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. A TDMA system may implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system may implement 3GPP-LTE ($3^{rd}$ Generation Partnership Project Long Term Evolution) or some other standards known in the art.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal. Moreover, as used herein, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

In some aspects the teachings herein may be employed in a network that includes macro scale coverage (e.g., a large area cellular network such as a 3G network, typically referred to as a macro cell network) and smaller scale coverage (e.g., a residence-based or building-based network environment). As an AT or UE moves through such a network, the access terminal may be served in certain locations by ANs that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

As noted above, the popularity of high-rate wireless data services is increasing the demand for access to available frequency spectrum. The ability to satisfy the demand is often limited by a lack of available frequency spectrum that may be used for reliable communications within a geographic area. In turn, there lies a challenge to accommodate the increasing demand for spectrum access, and the ongoing development of wireless networks aims to improve the spectral efficiency of wireless networks used to deliver data services.

In a variety of wireless networks, to alleviate demand for channel access, the available traffic channels in a particular segment of frequency spectrum are shared by multiple users. For example, in one implementation an access terminal negotiates an air-link connection (i.e. access to a traffic channel) with serving access point when the access terminal has data to transmit. In order to enable channel access sharing, many wireless networks employ dormancy timers that are used to terminate a respective air-link connection to a particular access terminal that has been dormant (i.e. not transmitting data) for at least the duration of the timer (e.g. 2 seconds). The timers enable sharing of traffic channels among many access terminals by re-assigning channel access at least when a particular access terminal with an established air-link connection fails to make use of the air-link connection.

However, the processes for establishing and managing air-link connections between a mobile device and a base station are distinctly different from the processes provided by TCP/IP for data communication between processing devices. TCP/IP uses a client-server model of communication in which a client computer requests and is provided a service, such as the content of a website, by a server. In order to facilitate communication between a client and a server, the client device sends ACK messages when data is received successfully from the server. The server may hold further data until it receives an ACK meesage from the client device. Similarly, the server sends ACK messages when data is received successfully from the client.

TCP/IP is also often used in combination with Hypertext Transfer Protocol (HTTP) when the server hosts a website. The client submits an HTTP request message to the server. The server, which stores content, provides the requested content to the client. An HTTP request message is referred to as a "GET" message or packet. In order to fully download a website a client may have to transmit multiple GET messages to retrieve all of the associated content, some of which may be less valuable to a user than the content actually sought. The GET messages are generally processed in the order in which they are received by the server. A server typically waits to receive a respective ACK message in response to previously transmitted content before transmitting the content associated with the next GET message. That is, GET messages are processed one-at-a-time by transmitting the associated content for one GET and waiting for an ACK before transmitting the associated content for the next GET.

The foundations of TCP/IP and HTTP were initially designed for wire-line and optical networks, in which available communication channels are not limited to the same extent as they are in wireless networks. As such, there are number of problems associated with TCP/IP and HTTP complaint messaging over wireless networks, and in particular, there are numerous inefficiencies created by employing TCP/IP and HTTP in wireless networks.

FIG. 1 is a simplified block diagram of a portion of an example communication system 100. The system 100 includes an access terminal 110, an access point 10, a radio access gateway 12, a wide area network 14, and an application server 20. Those skilled in the art will appreciate that a communication system may include fewer, more and/or different components than are illustrated in FIG. 1, and that FIG. 1 merely includes components more pertinent to aspects of implementations disclosed herein.

For example, while a single application server 20 has been illustrated in FIG. 1, those skilled in the art will appreciate that a communication system can include any number of application servers, including no application servers at all. The wide area network 14 may include a public network, a private network, a portion of the internet and/or any combination thereof. Further, the radio access gateway 12 and the access point 10 may be included in a wireless network, the remainder of which has not been illustrated for the sake of brevity. The access point 10 also includes an antenna 11.

The access terminal 110 includes an application controller 120, a TCP stack 130 and a wireless modem 140. The wireless modem 140 includes a radio stack 141 and is connectable to an antenna 142. Those skilled in the art will appreciate that these function blocks included in the access terminal may be each implemented by a suitable combination of software, hardware and/or firmware. Moreover, those skilled in the art will appreciate that an access terminal includes fewer or more components than are illustrated in FIG. 1, and that the access terminal 110 of FIG. 1 merely includes components more pertinent to aspects of implementations disclosed herein.

In operation the application controller 120 is generally employed to control and/or monitor applications running on the access terminal 110. For example, a first application 121 is illustrated as running within the purview of the application controller 120. The first application 121 is a client-side application of the respective application servers 20. For example, the application 121 may be a web browser attempting to download the content of a website from the application server 20.

The air-link connection between the access terminal 110 and the access point 10 is typically divided into a forward link 31 and a reverse link 32. The forward link 31 is used by the access point 10 to transmit information to the access terminal 110. The reverse link 32 is used by the access terminal 110 to transmit information to the access point 10.

Near the edge of a coverage area, the effective data capacity of the reverse link 32 is often diminished because the peak allowable transmission power of access terminals is typically limited by both the available battery and by the network operator to reduce interference. Subsequently, the access terminal 110 may transmit data to the network/access point at a reduced data rate. In turn, it takes longer for data to be transmitted from the access terminal 110 to the access point 10 when the access terminal 110 is near the edge of the coverage area.

By contrast, the capacity of the forward link 31 is typically substantially unaffected by the distance between the access point 10 and the access terminal 110 within the predetermined coverage area of the access point 10. Nevertheless, delays on the reverse link 32 may have an adverse impact on an access terminal 110 attempting to download the associated content of a website over the forward link.

For example, as noted above, a server waits for an ACK packet before transmitting the content associated with the next GET. Reverse link ACK packets provided in response to forward link traffic and GET packets are treated with the same priority by conventional mobile devices. At low reverse link data rates, small ACK packets may get stuck behind GET packets, which are typically much longer than ACK packets. Consequently, ACK packets can be delayed by GET packets. This may result in a TCP connection timeout on the forward link which degrades the HTTP page download time and the user experience. Further, while the server is waiting for the ACK packet, the portion of the spectrum allocated for the forward link is severely underutilized because while it is assigned to the mobile, no data is being transmitted over it. In other words, the forward link is idle when it could be used to send data to the mobile device or re-assigned to another mobile device while the server waits for an ACK packet.

In another example, some reverse link packets lead to more forward link traffic than others. As a result, in some implementations, it may be desirable to distinguish between the various types of packets and prioritize the transmission of packets that lead to more forward link traffic. In yet another example, some GET packets lead to forward link traffic that is more valuable to the user experience than other GET packets. For example, GET packets related to advertisement URLs are typically less valuable to a user than GET packets for the actual content sought by a user. As a result, in some implementations, it may be desirable to distinguish between various GET packets and determine which GET packets are more likely to provide a user with the content the user is likely most interested in.

Some implementations provide a method for prioritizing ACK packets over GET packets, so that ACK packets are transmitted with a reduced latency in order to improve download time and spectral efficiency of the forward link. Some implementations provide a method for prioritizing packets for some types of URLs over other packets for some other types of URLs, so that high priority packets are transmitted with a reduced latency in order to improve download time and spectral efficiency of the forward link. Some implementations provide a method for prioritizing GET packets over other GET packets, so that higher priority GET packets are transmitted with a reduced latency in order to improve download time and spectral efficiency of the forward link and improve and/or reduce the reductions in the quality of the user experience.

In one implementation, the method includes sorting shorter packets from longer packets. The method also includes buffering and transmitting longer packets until after one or more of the shorter packets have been transmitted. The method also optionally includes weighting packets according to their determined lengths, and transmitting packets based on the determined weights. In one implementation, the method includes sorting packets at least according to one of size, type and nature of the data in the packets. Accordingly, sorting of the packets includes at least one of determining the size and the type of each packet. In one implementation, sorting the packets includes deep-packet inspection to determine a respective priority value for each packet. In one implementation the deep-packet inspection includes determining the URL for which the packet is destined and applying a respective priority.

Figure 2:
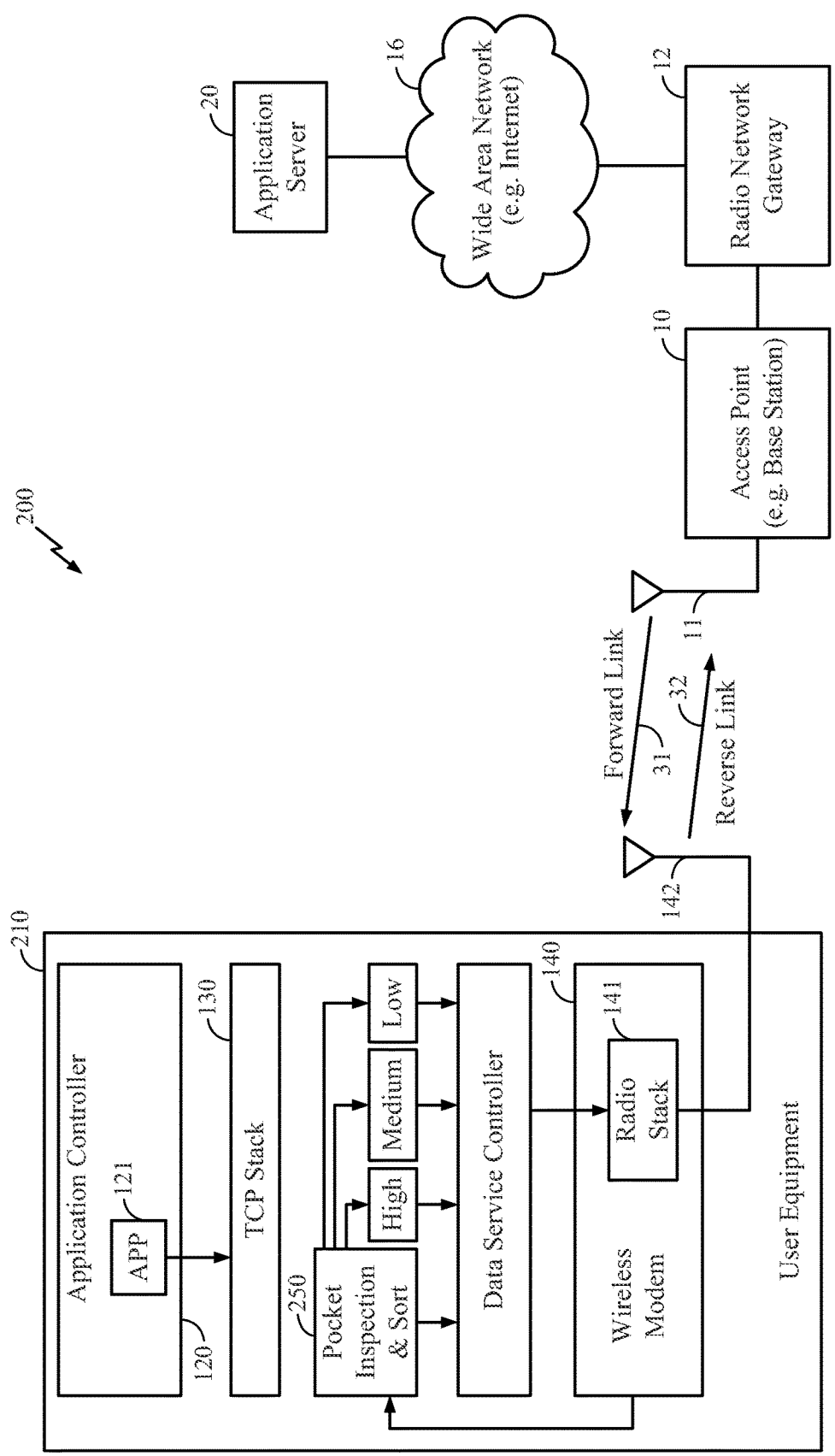
FIG. 2 is a simplified block diagram of a portion of a communication system including an example implementation of a modified access terminal

FIG. 2 is a simplified block diagram of a portion of a communication system 200 including an example implementation of a modified access terminal. The communication system 200 illustrated in FIG. 2 is similar to and adapted from the communication system 100 illustrated in FIG. 1. Elements common to both share common reference indicia, and only differences between the systems 100, 200 are described herein for the sake of brevity.

In particular, the access terminal 210 of FIG. 2 is configured to prioritize the transmission of packets on the reverse link to reduce latency on the forward link. To that end, as compared to the access terminal 110 of FIG. 1, the access terminal 210 of FIG. 2 includes a packet inspection and sort (PIS) module 250, a data service controller 254, a high priority packet queue 251, a medium priority packet queue 252, and a low priority packet queue 253. Those skilled in the art will appreciate that the functions of the PIS module 250, the data service controller 254 and the queues 251, 252, 253 can be performed by a suitable combination of software, hardware and/or firmware running on the access terminal 210, and that the functions have been grouped in the aforementioned functional blocks for the sake of describing aspects of a particular implementation. Moreover, while only queues for three respective priority levels are included in the access terminal of FIG. 1, those skilled in the art will appreciate from the present disclosure that any number of queues corresponding to any number priority levels can be specified. For example, in one implementation two priority levels are specified, namely, a high priority level and a nominal priority level. In another example, there are four or more priority levels. In one implementation the high, medium and low priority queues 251, 252, 253 each include one or more registers and/or addressable memory locations.

The PIS module 250 is connectable to receive packets from the TCP stack 130, and a control input from the wireless modem 140. The PSI module 250 selectively provides outputs to the data service controller 254 and the packet queues 251, 252, 253. The data service controller 254 is connectable to receive packets from the PIS module and the three packet queues 251, 252, 253, and to provide packets to the radio stack 141 of the wireless modem 140.

In operation the PIS module 250 receives the control input provided from the wireless modem 140. In one implementation, the control input is provided in response to the data rate on the reverse link falling below a particular threshold. In one implementation, the control input includes an indication of at least one of the reverse link data rate and a reverse link channel indicator. In response, the PIS module 250 determines whether or not to prioritize the packets from the TCP stack. In one implementation, the PIS modules 250 prioritizes the packets when the data rate on the reverse link is likely below a nominal rate, and does not prioritize the packets when the data rate on the reverse link is likely greater than or equal to a nominal rate. If the PIS module 250 does not prioritize the packets, the packets are passed to the data service controller 254. However, if the PIS module 250 prioritizes the packets, the packets are distributed, based at least on determined priorities, to the high priority packet queue 251, the medium priority packet queue 252, and the low priority packet queue 253. In response, the data service controller 254 services the respective queues 251, 252, 253 based at least in part on the respective priorities and/or the expected current reverse link data rate.

Various modes of operation for the access terminal are described below in greater detail with reference to the flowchart provided in FIGS. 3-7.

Figure 3:
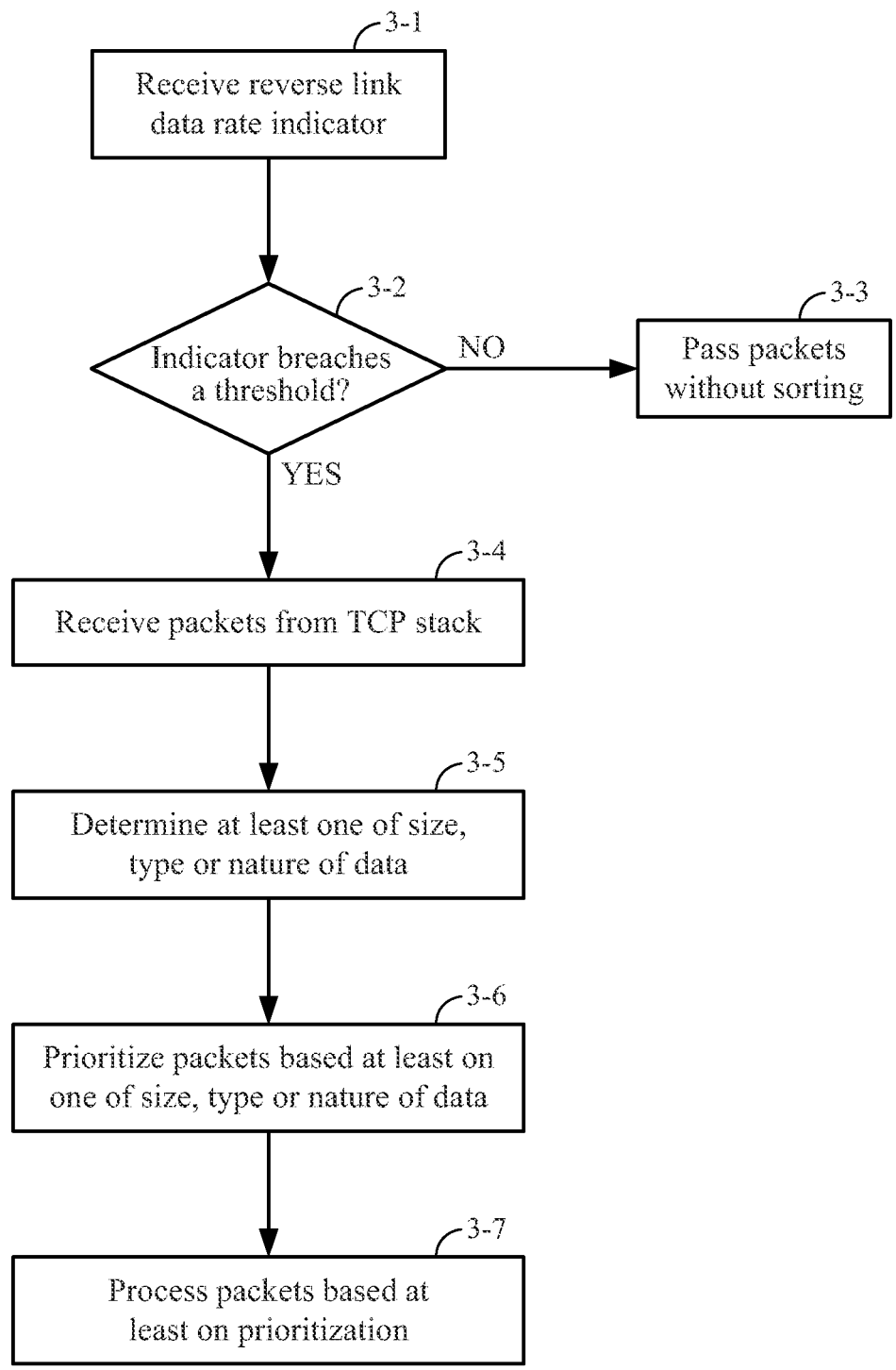
FIG. 3 is a flowchart of an implementation of a method.

FIG. 3 is a flowchart of an implementation of a method. In some implementations, the method is performed by a suitable combination of software, hardware and/or firmware included in an access terminal. As represented by block 3-1, the method includes receiving a reverse link data rate indicator. As discussed above, the reverse link data rate indicator provides an indication of the rate at which the access terminal can expect to transmit data to the access point. In some implementations, the reverse link data indicator is based at least in part on at least one of the distance between the access terminal and the access point, a measure of indicative of one or more channel conditions and a measure of the battery life.

As represented by block 3-2, the method includes determining whether or not the indicator breaches a threshold. In some implementations, the threshold is a lower bound, below which the access terminal can expect lower than nominal data rates on the reverse link to the access point. In some implementation, the threshold is an upper bound, above which the access terminal can expect lower than nominal data rates on the reverse link to the access point. If the indicator does not breach the threshold (No path from 3-3), the method includes relaying the packets received from a TCP stack (or the like) to a data service controller without sorting. The packets are relayed without sorting because the indicator is interpreted to indicate that the current reverse link data rate is at least a nominal value. In turn, the data service controller provides the packets to a wireless modem which transmits the packets over the reverse link.

On the other hand, if the indicator breaches the threshold (Yes path from 3-2), as represented by block 3-4, the method includes receiving packets from the TCP stack (or the like). As represented by block 3-5, the method includes determining at least one of the type, size and/or nature of the data in each packet. As represented by block 3-6, the method includes prioritizing packets based at least one of size, type and/or nature of the data in each packet. As represented by block 3-7, the method includes processing packets based at least on the respective prioritizations.

Figure 4:
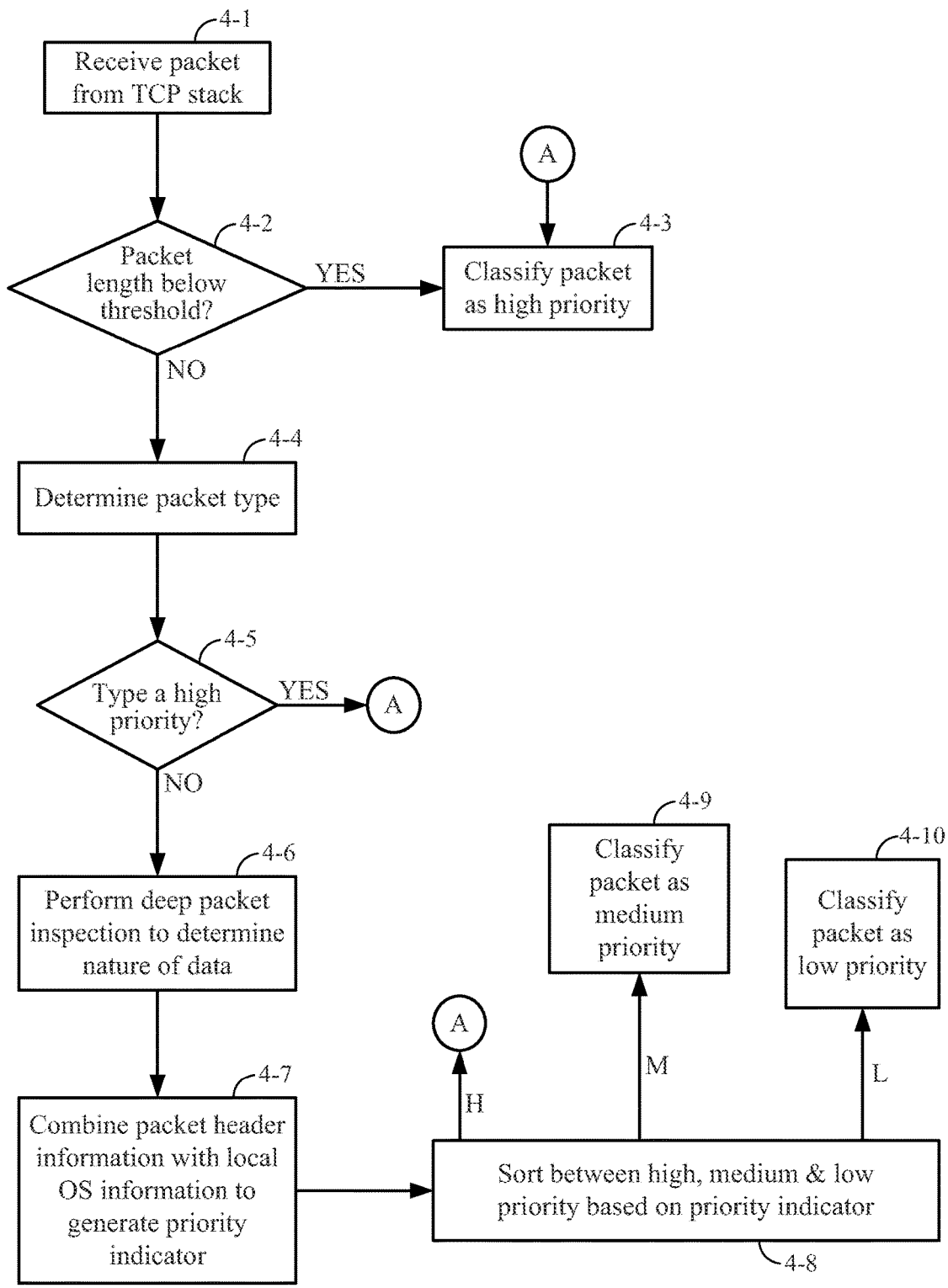
FIG. 4 is a flowchart of an implementation of a method.

FIG. 4 is a flowchart of an implementation of a method of prioritizing packets for reverse link transmission. In some implementations, the method is performed by a suitable combination of software, hardware and/or firmware included in an access terminal. As represented by block 4-1, the method includes receiving a packet from the TCP stack (or the like). As represented by block 4-2, the method includes determining if the length of the received packet is below a threshold. In some implementations, the transmission of packets below the threshold is expected to be relatively fast even at diminished reverse link data rates. In some instances, it may be advantageous to transmit such packets as quickly as possible. For example, short packets, such as ACK packets, often lead to more forward link traffic. As such, it is beneficial to transmit ACK packets as quickly as possible so as to reduce the amount of time the forward link is underutilized. As such, if the length of the packet is below the threshold (Yes path from 4-2), as represented by block 4-3, the method includes classifying the packet as a high priority packet. In some implementations, classifying the packet as a high priority packet includes placing the packet in a high priority buffer or transmission queue. On the other hand, if the length of the packet is not below the threshold (No path from 4-2), as represented by block 4-4, the method includes determining the packet type. In some implementations, determining the packet type includes parsing the packet header.

In turn, as represented by block 4-5, the method includes determining whether the determined type is a high priority type. In some implementations, determining whether a type is a high priority type includes retrieving a corresponding attribute of the packet type from a lookup table, database, and/or a memory.

In some implementations, packets may be categorized as high priority packets based on whether a packet is DNS query for a particular URL and/or types of URLs, a GET for some types of URLS that belong to an identified viewable area (on the screen) of a browser, and packets that correspond to signaling messages such as SIP, etc.

If the determined type is a high priority type (Yes path from 4-5), the method includes proceeding to the portion of the method represented by block 4-3. On the other hand, if the determined type is not a high priority (No path from 4-5), as represented by block 4-6, the method includes performing a deep packet inspection to determine the nature of the data in the packet. As described in greater detail below with reference to FIG. 5, the transmission of some packets on the reverse link may lead to a greater amount of forward link traffic back to the access terminal than other packets. Estimating the impact of a reverse link packet on forward link traffic is one way to improve spectral efficiency. In some implementations, estimating the impact of a reverse link packet on forward link traffic includes parsing the contents of the packet to determine how much, if any, forward link traffic will be generated in response to the reverse link packet. For example, while accessing a news page in a reverse link rate-restricted scenario, the device may selectively request the text portion of the news page and de-prioritize and/or not request images and other graphics.

As represented by block 4-7, the method includes combining the packet header information with local operating system (OS) information to generate a priority indicator. As represented by block 4-8, the method includes classifying the packet under a particular one of a plurality of priority levels. As illustrated in FIG. 4, in this example implementation, the plurality of priority levels includes a high priority, a medium priority and a low priority. As represented by block 4-3 (H path from 4-8), the method includes classifying a packet as a high priority packet. In some implementations, classifying the packet as a high priority packet includes placing the packet in a high priority buffer or transmission queue. As represented by block 4-9 (M path from 4-8), the method includes classifying a packet as a medium priority packet. In some implementations, classifying the packet as a medium priority packet includes placing the packet in a medium priority buffer or transmission queue. As represented by block 4-10 (L path from 4-8), the method includes classifying a packet as a low priority packet. In some implementations, classifying the packet as a low priority packet includes placing the packet in a low priority buffer or transmission queue.

While only three priority levels are described with reference to FIG. 4, those skilled in the art will appreciate from the present disclosure that any number of priority levels can be specified. For example, in one implementation two priority levels are specified, namely, a high priority level and a nominal priority level. In another example, there are four or more priority levels.

Figure 5:
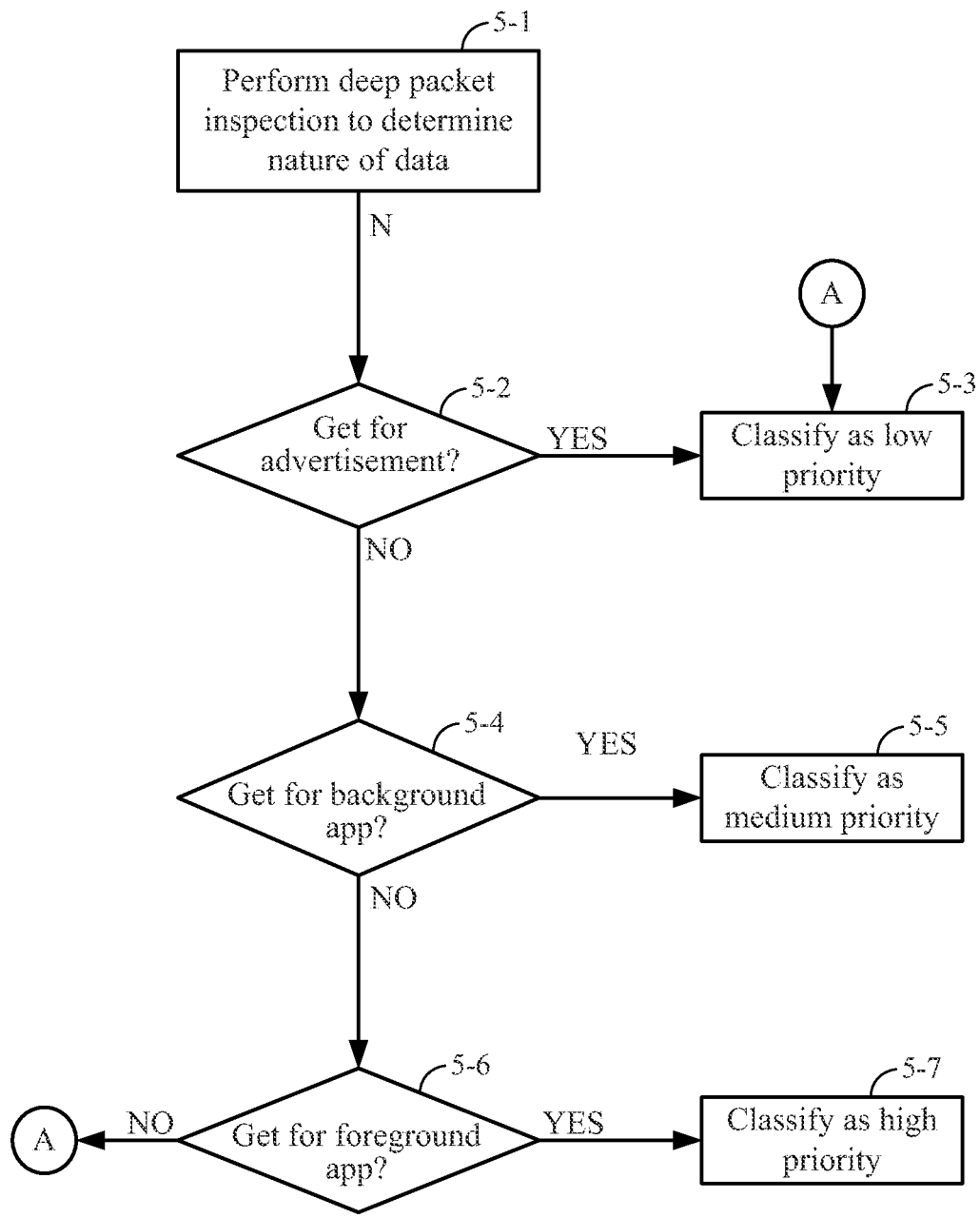
FIG. 5 is a flowchart of an implementation of a method.

FIG. 5 is a flowchart of an implementation of a method of prioritizing packets for reverse link transmission using deep packet inspection. In some implementations, the method is performed by a suitable combination of software, hardware and/or firmware included in an access terminal. As represented by block 5-1, the method includes performing deep packet inspection to determine the nature of the data in a packet. As represented by block 5-2, the method includes determining whether or not the packet includes a GET for an advertisement. Advertisements are typically less valuable to end users than the content of a website they are attempting to download. As such, when the reverse link data rate is lower than a nominal rate the reverse link transmission of GET packets for advertisements may diminish the user experience by slowing the transmission of GET packets for more valued content. As such, in the example implementation of the method of FIG. 5, if the packet includes a GET for an advertisement (Yes path from 5-2), as represented by block 5-3, the method includes classifying the packet as a low priority packet. In some implementations, classifying the packet as a low priority packet includes placing the packet in a low priority buffer or transmission queue.

On the other hand, if the packet does not include a GET for an advertisement, as represented by block 5-4, the method includes determining if the packet includes a GET related to an application that is running in the background according to information from the local operating system. That is, information about the packet obtained from the deep packet inspection is combined with information from the local operating system to provide an indication as to whether the packet is related to an application running in the background. An application running in the background typically includes an application that is not currently the primary focus of the user. In some implementations, this information may be obtained by determining which application the user is currently interacting with as opposed to merely observing or ignoring. If the packet includes a GET related to a background application (Yes path from 5-4), as represented by block 5-5, the method includes classifying the packet as a medium priority packet. In some implementations, classifying the packet as a medium priority packet includes placing the packet in a medium priority buffer or transmission queue.

On the other hand, if the packet does not include a GET related to background application, as represented by block 5-6, the method includes determining if the packet includes a GET related to an application that is running in the foreground according to the local operating system. An application running in the foreground typically includes an application that is currently the primary focus of the user. If the packet includes a GET related to a foreground application (Yes path from 5-6), as represented by block 5-7, the method includes classifying the packet as a high priority packet, because presumably the user is interested in receiving information, without substantial delay, related to the application that the user is currently focusing on. In some implementations, classifying the packet as a high priority packet includes placing the packet in a high priority buffer or transmission queue.

On the other hand, if the packet does not include a GET related to a foreground application (No path from 5-6), the method proceeds to the portion of the method represented by 5-3. That is, the packet is classified as a low priority packet. As such, in this example implementation, the default action is to classify packets as low priority to make way for packets that can be determined to be high priority packets. However, those skilled in the art will appreciate that in other implementations the default action may be to classify packets at another priority level based on system and/or user preferences.

Figure 6:
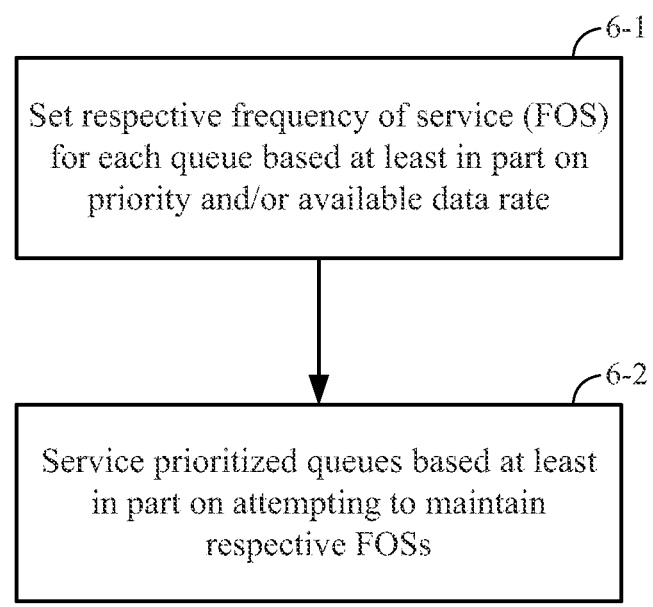
FIG. 6 is a flowchart of an implementation of a method.

FIG. 6 is a flowchart of an implementation of a method of transmitting packets based on the respective prioritization of each packet and/or a group of packets. In some implementations, the method is performed by a suitable combination of software, hardware and/or firmware included in an access terminal. As represented by block 6-1, the method includes setting a respective frequency-of-service (FOS) value for each of the priority levels recognized by the access terminal. Each respective FOS value is based at least in part on the corresponding priority level and/or the available reverse link data rate. For example, for each priority level there may be one or more different FOS values that each correspond to a different range of reverse link data rates. Accordingly, a particular FOS value is set based on the priority level and the current reverse link data rate. In another implementation, each priority level may have a single respective FOS value when the reverse link data rate is below a threshold level. As represented by block 6-2, the method includes servicing prioritized queues based at least in part on attempting to maintain FOS values for each priority level. In one implementation, each FOS value represents the relative amount of time and/or the relative number of packets from a particular queue serviced as compared to other queues at different priority levels. As such, given the randomness of data and packet generation, it may be difficult to strictly adhere to the FOS values selected for each priority level.

Figure 7:
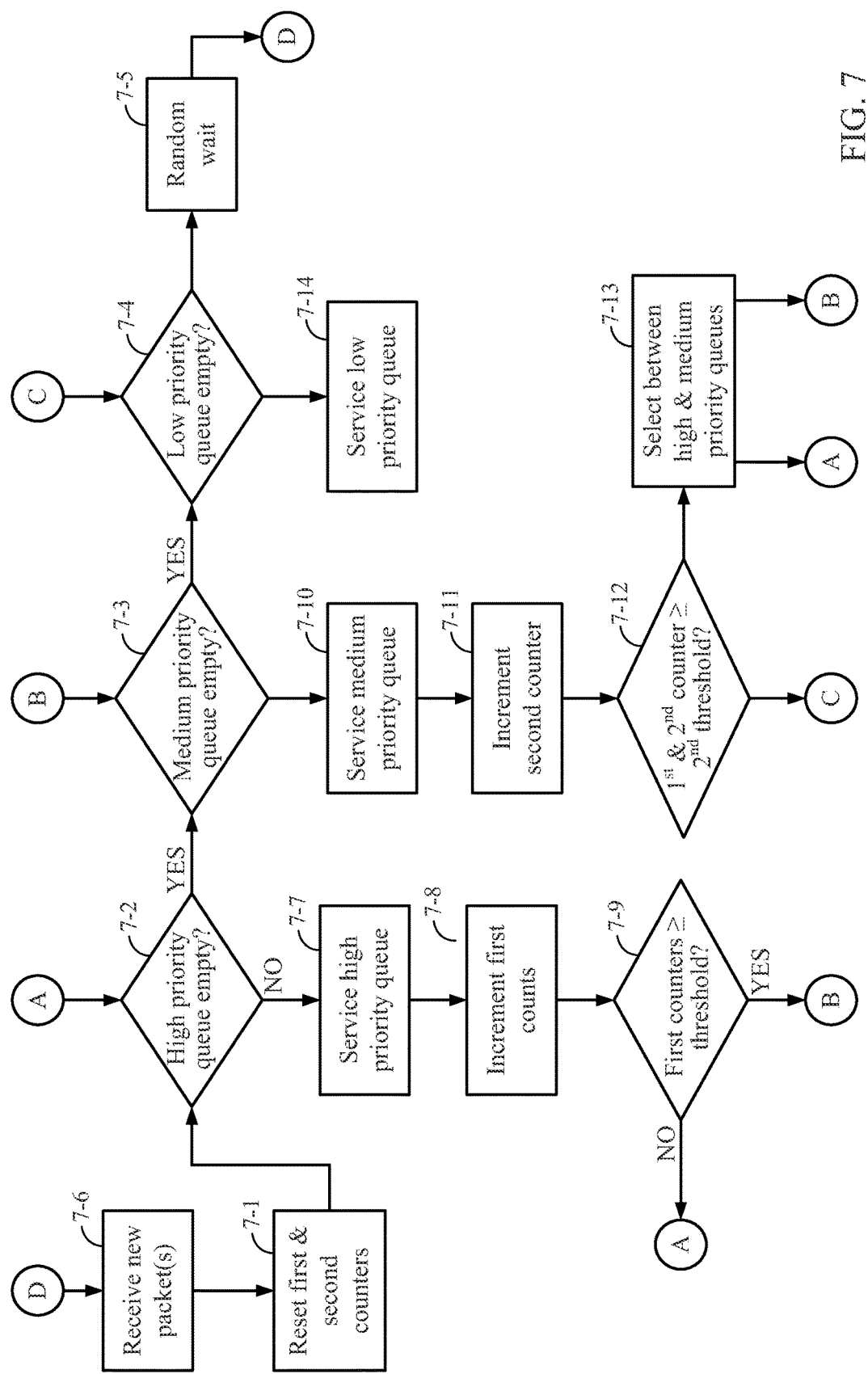
FIG. 7 is a flowchart of an implementation of a method.

FIG. 7 is a flowchart of an implementation of a method. In some implementations, the method is performed by a suitable combination of software, hardware and/or firmware included in an access terminal. As represented by block 7-1, the method includes resetting first and second counters. The first and second counters are used to regulate how frequently prioritized queues are serviced in an attempt to satisfy preselected FOS values for the prioritized queues. In this example, there are three prioritized queues, namely, a high priority queue, a medium priority queue, and a low priority queue. While only three priority levels are described with reference to FIG. 7, those skilled in the art will appreciate from the present disclosure that any number of priority levels can be specified. For example, in one implementation two priority levels are specified, namely, a high priority level and a nominal priority level. In another example, there are four or more priority levels.

As represented by block 7-2, the method includes determining whether or not the high priority queue is empty. An empty high priority queue indicates that there are no high priority packets currently ready for transmission to an access point. If the high priority queue is not empty (No path from 7-2), as represented by block 7-7, the method includes servicing the high priority queue. In some implementations, servicing the high priority queue includes transmitting at least a portion of the packets in the high priority queue to the access point. As represented by block 7-8, the method includes incrementing the first counter. As represented by block 7-9, the method includes determining whether or not the first counter is above a first threshold. In some implementations, the first threshold is set in relation to the current FOS value for the high priority queue. If the first counter is not greater than or equal to the first threshold value (No path from 7-9), the method proceeds back to the portion of the method represented by block 7-2. On the other hand, if the first counter is greater than or equal to the first threshold value (Yes path from 7-9), the method proceeds to the portion of the method represented by block 7-3.

Referring again to block 7-2, if the high priority queue is empty (Yes path from 7-2), as represented by block 7-3, the method includes determining whether or not the medium priority queue is empty. An empty medium priority queue indicates that there are no medium priority packets currently ready for transmission to the access point. If the medium priority queue is not empty (No path from 7-3), as represented by block 7-10, the method includes servicing the medium priority queue. In some implementations, servicing the medium priority queue includes transmitting at least a portion of the packets in the medium priority queue to the access point. As represented by block 7-11, the method includes incrementing the second counter. As represented by block 7-12, the method includes determining whether or not the sum of the first and second counters is above a second threshold. In some implementations, the second threshold is set in relation to at least the current FOS value for the medium priority queue. In some implementation, the second threshold is set in relation to at least the current FOS values for the high and medium priority queues. If the sum of the first and second counters is not greater than or equal to the second threshold value (No path from 7-12), as represented by block 7-12, the method includes selecting between the high and medium priority queues. In some implementations, the selection is based on an attempt to fairly service the high and medium priority queues based at least in part of the respective FOS values. The selection results in the method proceeding back to the portion of the method represented by either block 7-2 or block 7-3. On the other hand, if the sum of the first and second counters is greater than or equal to the second threshold value (Yes path from 7-12), the method proceeds to the portion of the method represented by block 7-4.

Referring again to block 7-3, if the medium priority queue is empty (Yes path from 7-3), as represented by block 7-4, the method includes determining whether or not the low priority queue is empty. An empty low priority queue indicates that there are no low priority packets currently ready for transmission to the access point. If the medium priority queue is not empty (No path from 7-4), as represented by block 7-14, the method includes servicing the low priority queue before proceeding to the portion of the method represented by block 7-6. In some implementations, servicing the low priority queue includes transmitting at least a portion of the packets in the low priority queue to the access point. On the other hand, if the medium priority queue is empty (No path from 7-4), as represented by block 7-4, as represented by block 7-5, the method includes waiting a random amount of time or receiving an indicator to proceed to the portion of the method represented by block 7-6. As represented block 7-6, the method includes receiving new packets into one or more of the high, medium and low priority queues.

Figure 8:
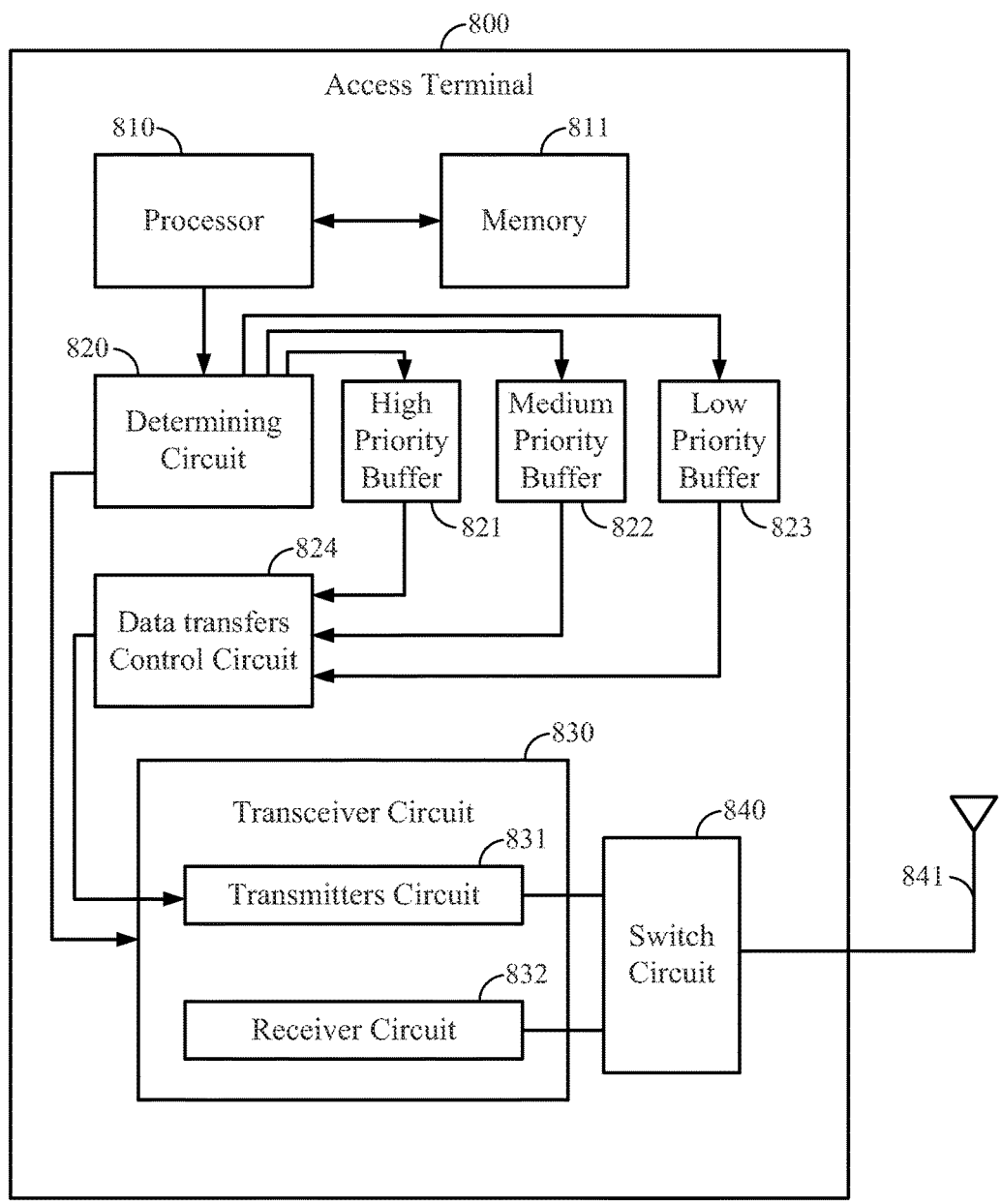
FIG. 8 is a block diagram of an example access terminal in accordance with certain aspects of the present disclosure.

FIG. 8 is a block diagram of a of an example access terminal in accordance with certain aspects of the present disclosure. Those skilled in the art will appreciate that an access terminal may have more components than the simplified access terminal 800 illustrated in FIG. 8. The access terminal 800 includes only those components useful for describing some prominent features of implementations within the scope of the claims. The access terminal 800 includes a processor 810, a memory 811, a determining circuit 820, a high priority buffer 821, a medium priority buffer 822, a low priority buffer 823, a data transfer control circuit 824, a transceiver circuit 830, a switch circuit 840 and an antenna 841.

While only buffers for three respective priority levels are included in the access terminal of FIG. 8, those skilled in the art will appreciate from the present disclosure that any number of buffers corresponding to any number priority levels can be specified. For example, in one implementation two priority levels are specified, namely, a high priority level and a nominal priority level. In another example, there are four or more priority levels. In one implementation the high, medium and low priority buffers 821, 822, 823 each include one or more registers and/or addressable memory locations. In one implementation, means for buffering includes one or more buffers.

In one implementation the processor 810 is configured process computer program code of one of more application stored in the memory. In one implementation, means for processing includes a processor. In one implementation, a storage means includes a memory. In one implementation, the determining circuit 820 is configured to determine the priority level of one or more packets and/or whether or not to determine a respective priority level for a packet. In one implementation, means for determining includes a determining circuit. In one implementation, the data transfer control circuit 824 is configured to selectively service the high, medium and low priority buffers 821, 822, 823. In one implementation, means for data control includes a data transfer control circuit.

In one implementation, the transceiver circuit 830 is configured to transmit packets to an access point via the antenna 841. To that end, the transceiver circuit 830 includes a transmitter circuit 831. In one implementation, means for transmitting includes a transmitter circuit. In one implementation, the transceiver circuit 830 is configured to receive packets from the access point via the antenna 841. To that end, the transceiver circuit 830 includes a receiver circuit 832. In one implementation, means for receiving includes a receiver circuit. In one implementation, the switch circuit 840 is configured to switch the antenna 841 between the receiver circuit 832 and the transmitter circuit 831.

Figure 9:
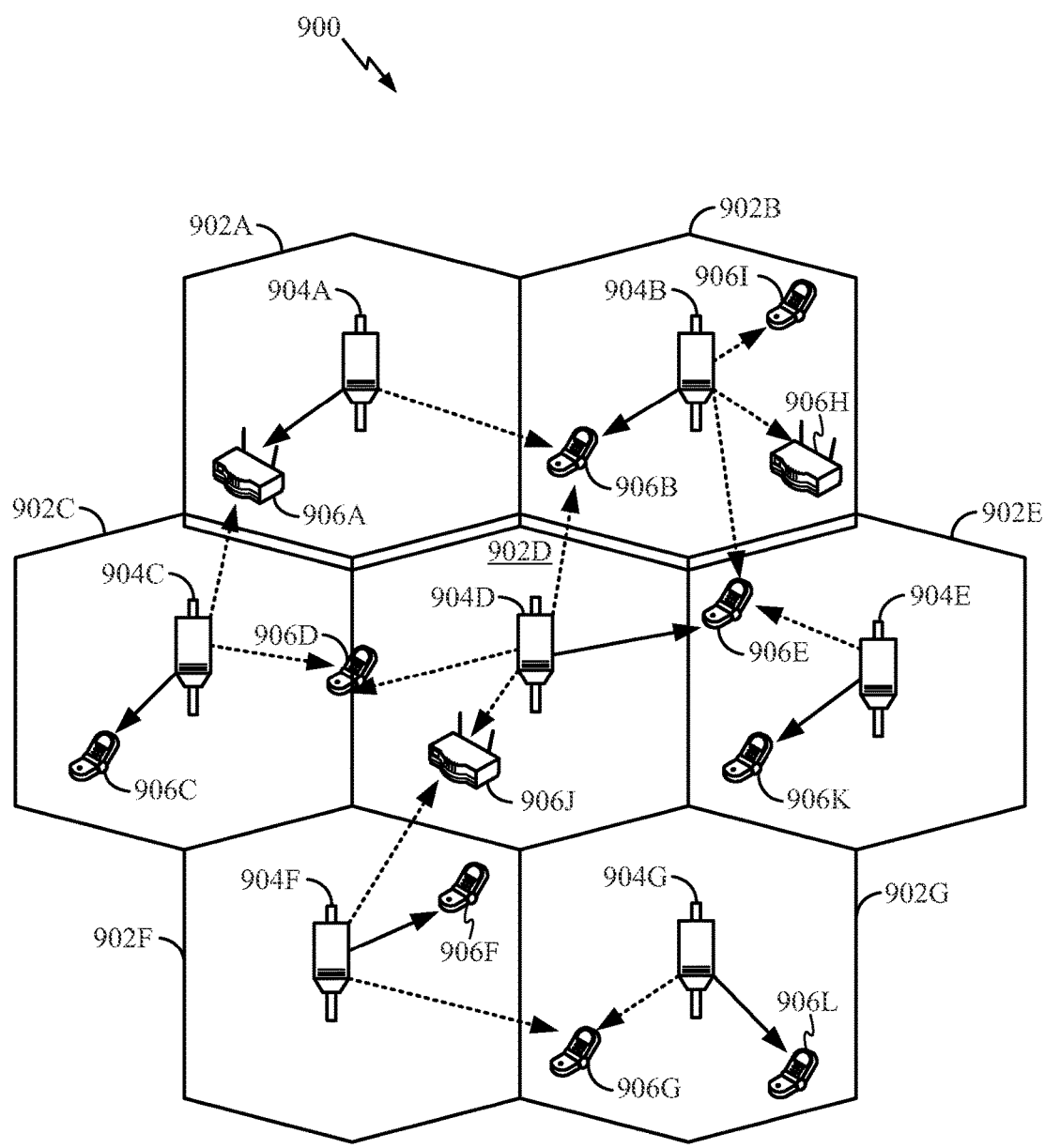
FIG. 9 is a simplified diagram of a wireless communication system.

FIG. 9 is a simplified diagram of a wireless communication system 900, configured to support a number of users, in which the teachings herein may be implemented. The system 900 provides communication for multiple cells 902, such as, for example, macro cells 902A-902G, with each cell being serviced by a corresponding access point 904 (e.g., access points 904A-904G). Access terminals 906 (e.g., access terminals 906A-906L) may be dispersed at various locations throughout the system over time. Each access terminal 906 may communicate with one or more access points 904 on a forward link (FL) and/or a reverse link (RL) at a given moment, depending upon whether the access terminal 906 is active and whether it is in soft handoff, for example. The wireless communication system 900 may provide service over a large geographic region. For example, macro cells 902A-902G may cover a few blocks in a densely populated urban neighborhood or several miles in rural environment.

Figure 10:
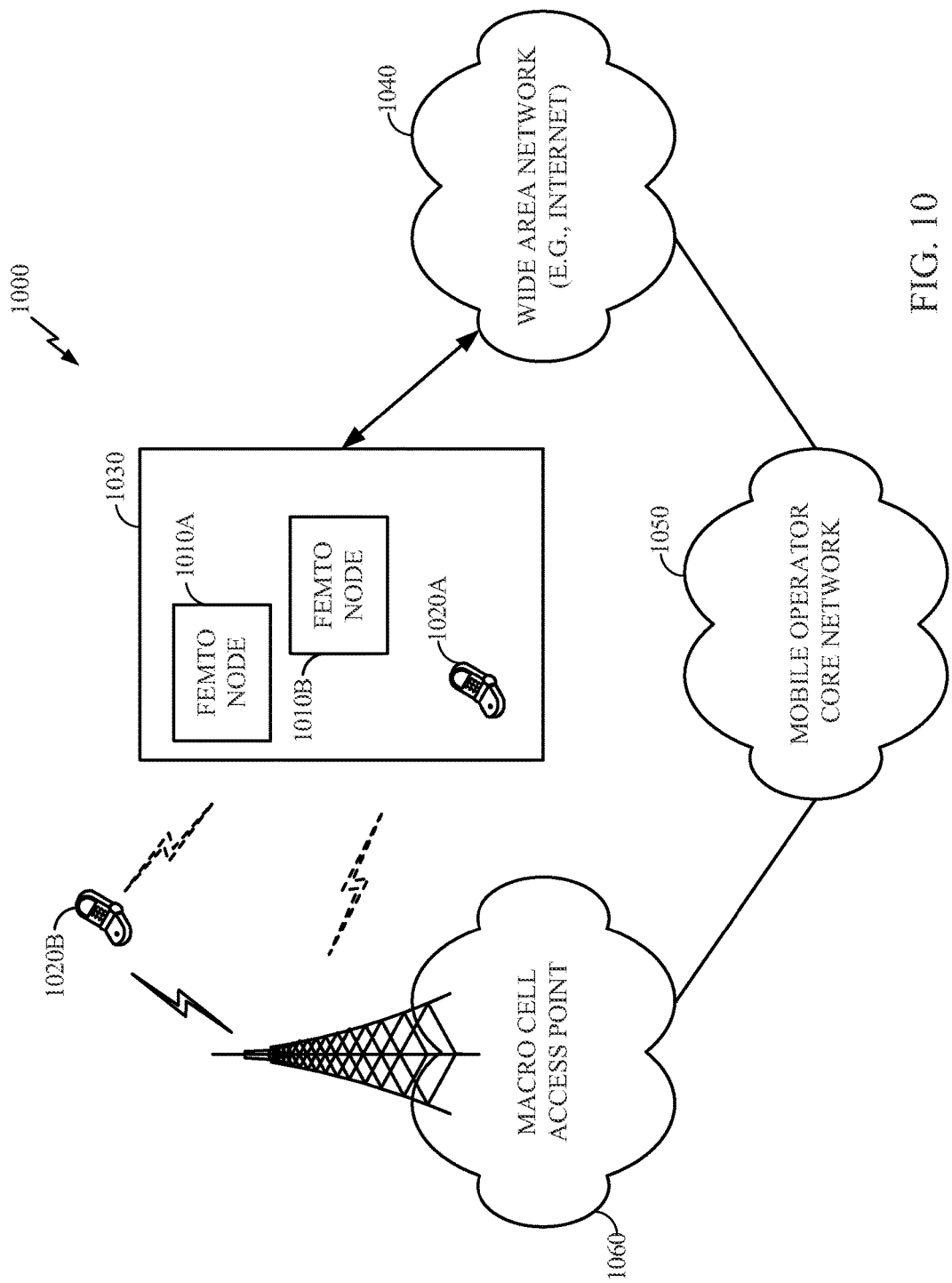
FIG. 10 is a simplified diagram of a wireless communication system including femto nodes.

FIG. 10 is a simplified diagram of an example communication system 1000 where one or more femto nodes are deployed within a network environment. Specifically, the system 1000 includes multiple femto nodes 1010 (e.g., femto nodes 1010A and 1010B) installed in a relatively small scale network environment (e.g., in one or more user residences 1030). Each femto node 1010 may be coupled to a wide area network 1040 (e.g., the Internet) and a mobile operator core network 1050 via a DSL router, a cable modem, a wireless link, or other connectivity means (not shown). As will be discussed below, each femto node 1010 may be configured to serve associated access terminals 1020 (e.g., access terminal 1020A) and, optionally, alien access terminals 1020 (e.g., access terminal 1020B). In other words, access to femto nodes 1010 may be restricted whereby a given access terminal 1020 may be served by a set of designated (e.g., home) femto node(s) 1010 but may not be served by any non-designated femto nodes 1010 (e.g., a neighbor's femto node 1010).

Figure 11:
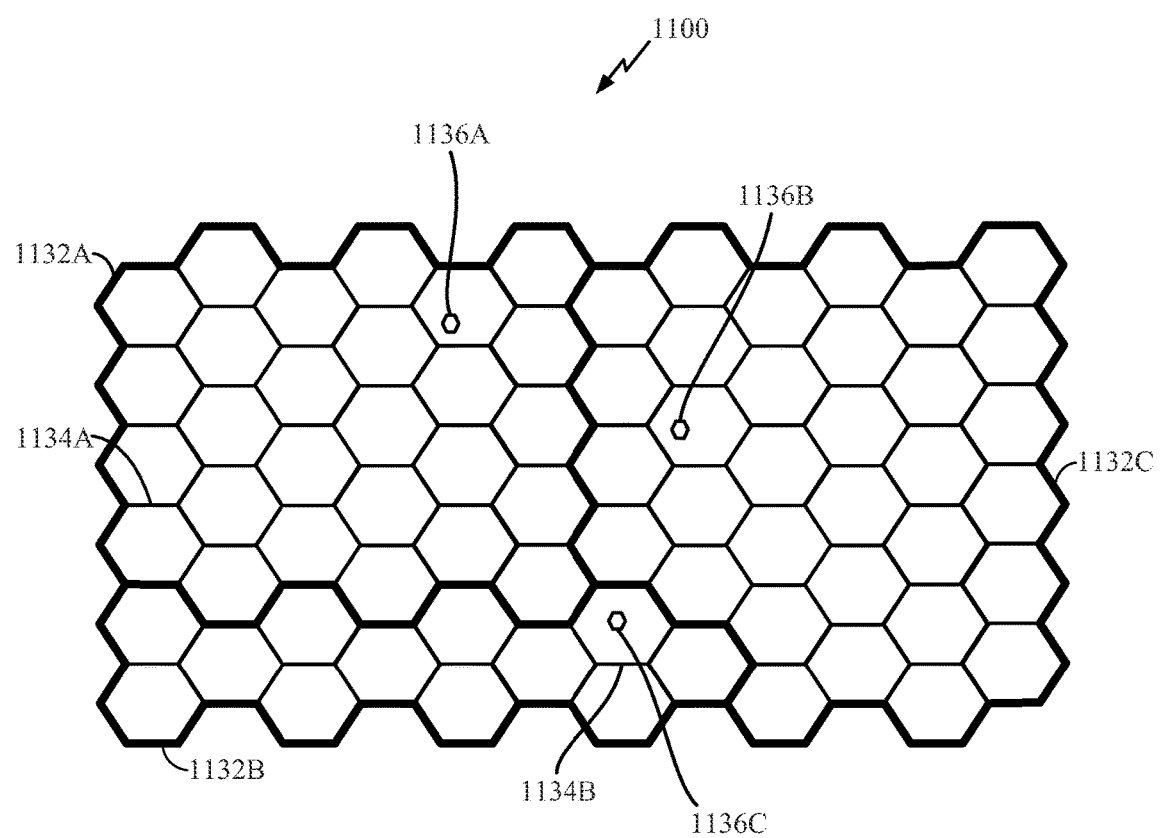
FIG. 11 is a simplified diagram illustrating coverage areas for wireless communication.

FIG. 11 is a simplified diagram illustrating an example of a coverage map 1100 where several tracking areas 1102 (or routing areas or location areas) are defined, each of which includes several macro coverage areas 1104. Here, areas of coverage associated with tracking areas 1102A, 1102B, and 1102C are delineated by the wide lines and the macro coverage areas 1104 are represented by the hexagons. The tracking areas 1102 also include femto coverage areas 1106. In this example, each of the femto coverage areas 1106 (e.g., femto coverage area 1106C) is depicted within a macro coverage area 1104 (e.g., macro coverage area 1104B). It should be appreciated, however, that a femto coverage area 1106 may not lie entirely within a macro coverage area 1104. In practice, a large number of femto coverage areas 1106 may be defined with a given tracking area 1102 or macro coverage area 1104. Also, one or more pico coverage areas (not shown) may be defined within a given tracking area 1102 or macro coverage area 1104.

Referring again to FIG. 10, the owner of a femto node 1010 may subscribe to mobile service, such as, for example, 3G and/or 4G mobile service, offered through the mobile operator core network 1050. In addition, an access terminal 1020 may be capable of operating both in macro environments and in smaller scale (e.g., residential) network environments. In other words, depending on the current location of the access terminal 1020, the access terminal 1020 may be served by a macro cell access point 1060 associated with the mobile operator core network 1050 or by any one of a set of femto nodes 1010 (e.g., the femto nodes 1010A and 1010B that reside within a corresponding user residence 1030). For example, when a subscriber is outside his home, he is served by a standard macro access point (e.g., access point 1060) and when the subscriber is at home, he is served by a femto node (e.g., node 1010A). Here, it should be appreciated that a femto node 1010 may be backward compatible with existing access terminals 1020.

A femto node may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 1010 that reside within the corresponding user residence 1030). In some implementations, a node may be restricted to not provide, for at least one node, at least one of: signaling, data access, registration, paging, or service.

For convenience, the disclosure herein describes various functionality in the context of a femto node. It should be appreciated, however, that a pico node may provide the same or similar functionality for a larger coverage area. For example, a pico node may be restricted, a home pico node may be defined for a given access terminal, and so on.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 12:
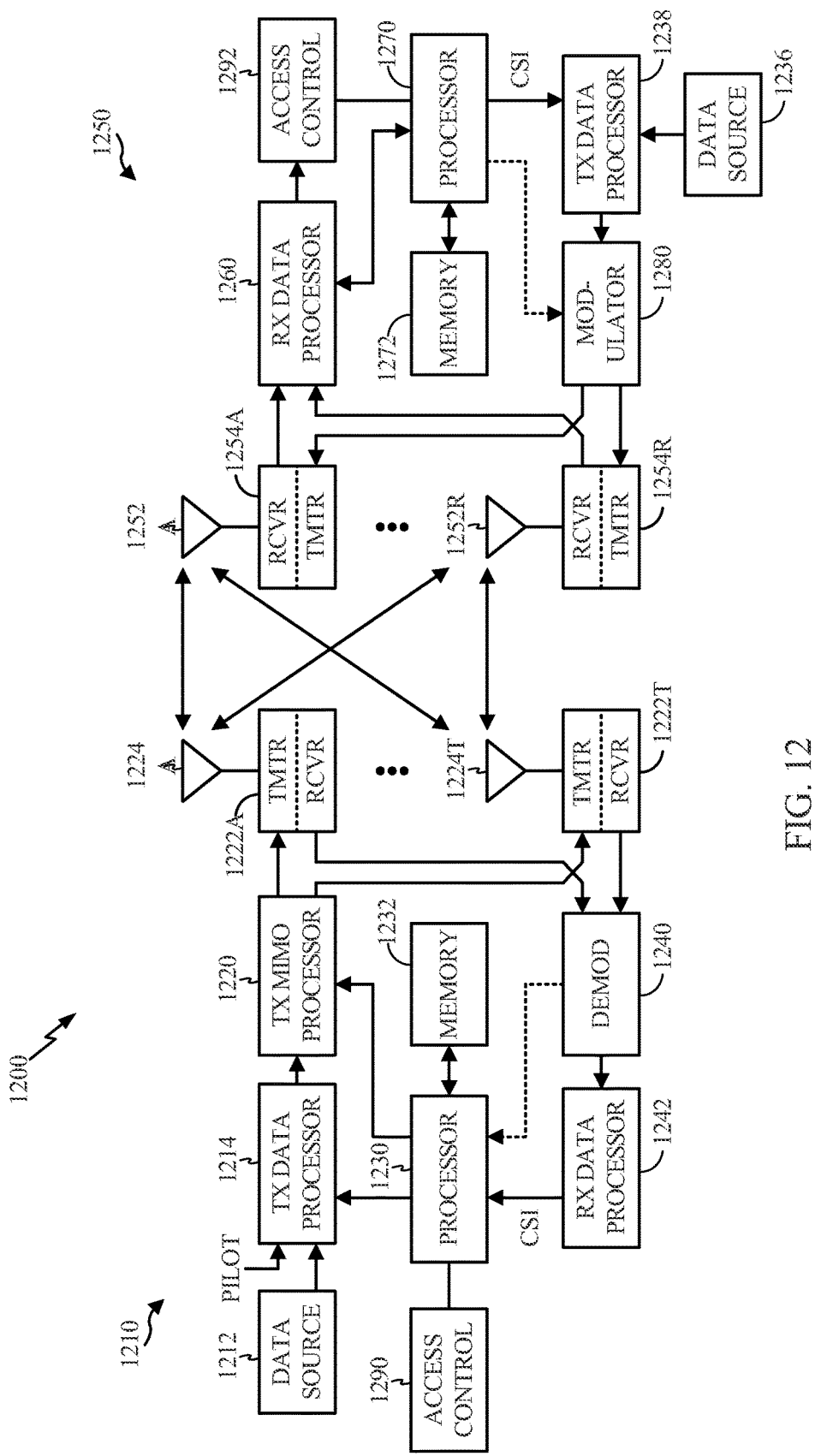
FIG. 12 is a simplified block diagram of several sample aspects of communication components.

The teachings herein may be incorporated into a node (e.g., a device) employing various components for communicating with at least one other node. FIG. 12 depicts several sample components that may be employed to facilitate communication between nodes. Specifically, FIG. 12 is a simplified block diagram of a first wireless device 1210 (e.g., an access point) and a second wireless device 1250 (e.g., an access terminal) of a MIMO system 1200. At the first device 1210, traffic data for a number of data streams is provided from a data source 1212 to a transmit (TX) data processor 1214.

In some aspects, each data stream is transmitted over a respective transmit antenna. The TX data processor 1214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1230. A data memory 1232 may store program code, data, and other information used by the processor 1230 or other components of the device 1210.

The modulation symbols for all data streams are then provided to a TX MIMO processor 1220, which may further process the modulation symbols (e.g., for OFDM). The TX MIMO processor 1220 then provides $N_T$ modulation symbol streams to $N_T$ transceivers (XCVR) 1222A through 1222T. In some aspects, the TX MIMO processor 1220 applies beam-forming weights to the symbols of the data streams and to the antenna from which the symbol is being transmitted.

Each transceiver 1222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1222A through 1222T are then transmitted from $N_T$ antennas 1224A through 1224T, respectively.

At the second device 1250, the transmitted modulated signals are received by $N_R$ antennas 1252A through 1252R and the received signal from each antenna 1252 is provided to a respective transceiver (XCVR) 1254A through 1254R. Each transceiver 1254 conditions (e.g., filters, amplifies, and downconverts) a respective received signal, digitizes the conditioned signal to provide samples, and further processes the samples to provide a corresponding "received" symbol stream.

A receive (RX) data processor 1260 then receives and processes the $N_R$ received symbol streams from $N_R$ transceivers 1254 based on a particular receiver processing technique to provide $N_T$ "detected" symbol streams. The RX data processor 1260 then demodulates, deinterleaves, and decodes each detected symbol stream to recover the traffic data for the data stream. The processing by the RX data processor 1260 is complementary to that performed by the TX MIMO processor 1220 and the TX data processor 1214 at the device 1210.

A processor 1270 periodically determines which pre-coding matrix to use (discussed below). The processor 1270 formulates a reverse link message comprising a matrix index portion and a rank value portion. A data memory 1272 may store program code, data, and other information used by the processor 1270 or other components of the second device 1250.

The reverse link message may comprise various types of information regarding the communication link and/or the received data stream. The reverse link message is then processed by a TX data processor 1238, which also receives traffic data for a number of data streams from a data source 1236, modulated by a modulator 1280, conditioned by the transceivers 1254A through 1254R, and transmitted back to the device 1210.

At the device 1210, the modulated signals from the second device 1250 are received by the antennas 1224, conditioned by the transceivers 1222, demodulated by a demodulator (DEMOD) 1240, and processed by a RX data processor 1242 to extract the reverse link message transmitted by the second device 1250. The processor 1230 then determines which pre-coding matrix to use for determining the beam-forming weights then processes the extracted message.

FIG. 12 also illustrates that the communication components may include one or more components that perform access control operations as taught herein. For example, an access control component 1290 may cooperate with the processor 1230 and/or other components of the device 1210 to send/receive signals to/from another device (e.g., device 1250) as taught herein. Similarly, an access control component 1292 may cooperate with the processor 1270 and/or other components of the device 1250 to send/receive signals to/from another device (e.g., device 1210). It should be appreciated that for each device 1210 and 1250 the functionality of two or more of the described components may be provided by a single component. For example, a single processing component may provide the functionality of the access control component 1290 and the processor 1230 and a single processing component may provide the functionality of the access control component 1292 and the processor 1270.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In summary, it should be appreciated that a computer-readable medium may be implemented in any suitable computer-program product.

The above description is provided to enable any person skilled in the art to make or use embodiments within the scope of the appended claims. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method comprising:
    determining, at a mobile user equipment, an estimated impact on a wireless forward link packet to be received by the user equipment from an access point caused by a delay in sending at least one wireless reverse link packet to the access point, the estimated impact including at least one of an estimate of an amount of time that the wireless forward link will be idle as a result of the delay in sending the at least one wireless reverse link packet to the access point or an estimate of an amount of forward link traffic that will be generated in response to the at least one wireless reverse link packet, wherein the estimated impact is based on a size of the at least one wireless reverse link packet, a type of the at least one wireless reverse link packet, a nature of data included in the at least one wireless reverse link packet, or any combination thereof;
    determining, at the user equipment, a priority for the at least one wireless reverse link packet for transmission from the user equipment to the access point when an indicator relating to the estimated impact breaches a corresponding threshold value;
    refraining from assigning a priority to the at least one wireless reverse link packet when the indicator does not breach the corresponding threshold value,
    wherein the priority for the at least one wireless reverse link packet is based on at least the estimated impact on a forward link packet to be received by the user equipment from the access point caused by a delay in sending the at least one reverse link packet to the access point; and
    transmitting the at least one reverse link packet from the UE to the access point based on at least the determined priority for the at least one reverse link packet.

2. The method of claim 1, wherein the indicator comprises an indicator of a reverse link data rate, the method further comprising:
    receiving the indicator of the reverse link data rate associated with a reverse link from the user equipment to the access point, wherein the determining the priority for the at least one reverse link packet is based at least in part on the indicator of the reverse link data rate.

3. The method of claim 2, further comprising comparing the indicator of the reverse link data rate to a threshold value.

4. The method of claim 3, wherein the threshold value includes a lower bound, below which the user equipment can expect lower than nominal data rates on the reverse link to the access point.

5. The method of claim 3, wherein the threshold value is an upper bound, above which the user equipment can expect lower than nominal data rates on the reverse link to the access point.

6. The method of claim 3, further comprising sorting the at least one reverse link packet when the indicator of the reverse link data rate meets the threshold value such that the user equipment expects lower than nominal data rate on the reverse link.

7. The method of claim 1, further comprising determining a size of the at least one wireless reverse link packet and a type of data included in the at least one wireless reverse link packet.

8. The method of claim 1, wherein the determining the priority for the at least one wireless reverse link packet includes:
    determining a length of the at least one wireless reverse link packet; and
    prioritizing the at least one wireless reverse link packet based at least on the determined length of the at least one wireless reverse link packet.

9. The method of claim 8, wherein the prioritizing the at least one wireless reverse link packet based at least on the determined length of the at least one wireless reverse link packet includes weighting the at least one wireless reverse link packet that is below a particular length threshold.

10. The method of claim 1, wherein the determining the priority for the at least one wireless reverse link packet includes:
    determining a type of the at least one wireless reverse link packet; and
    prioritizing the at least one wireless reverse link packet based at least on the determined type of the at least one reverse link packet.

11. The method of claim 10, wherein the prioritizing the at least one wireless reverse link packet based at least on the determined type of the at least one wireless reverse link packet includes weighting particular types of the at least one wireless reverse link packet.

12. The method of claim 1, wherein the determining the priority for the at least one wireless reverse link packet includes:
    performing deep packet inspection of data included in the at least one wireless reverse link packet; and
    prioritizing the at least one wireless reverse link packet based at least on the deep packet inspection of the data included in the at least one wireless reverse link packet.

13. The method of claim 12, wherein the prioritizing the at least one wireless reverse link packet based at least on the deep packet inspection of the data included in the at least one wireless reverse link packet includes weighting particular types of data.

14. The method of claim 13, wherein the at least one wireless reverse link packet associated with a GET message for requesting advertising information in the wireless forward link packet is given a low priority.

15. The method of claim 14, wherein ACK messages for acknowledging a forward link transmission are given a higher priority than GET messages.

16. The method of claim 13, wherein the at least one wireless reverse link packet associated with a domain name system (DNS) query packet is given a relatively high priority.

17. The method of claim 1, wherein the determining the priority for the at least one wireless reverse link packet includes:
  determining whether the at least one wireless reverse link packet is related to a foreground application or a background application; and
  prioritizing the at least one wireless reverse link packet based at least on whether the at least one wireless reverse link packet is related to the foreground application or the background application.

18. The method of claim 17, wherein the determining whether the at least one wireless reverse link packet is related to the foreground application or the background application is based at least in part on information from an operating system managing applications on the user equipment.

19. The method of claim 1, further comprising:
  sorting the at least one wireless reverse link packet into respective queues for corresponding priority levels;
  setting at least one frequency of service value for each priority level; and
  servicing the respective queues based at least on the corresponding frequency of service value for the respective priority level.

20. The method of claim 19, wherein the at least one frequency of service value is based on a particular priority level and an indicator of a reverse link data rate.

21. The method of claim 19, wherein the priority levels are ranked based at least on one of the estimated amount of time that the forward link will be idle or the estimated likelihood that the forward link will be idle.

22. The method of claim 1, wherein the at least one wireless reverse link packet comprises a transmission control protocol (TCP) ACK message, and wherein the wireless forward link packet comprises a TCP message generated in response to receiving the TCP ACK message.

23. The method of claim 1, wherein the indicator comprises a reverse link data rate.

24. The method of claim 1, wherein the estimated impact includes an estimate of an amount of time that the wireless forward link will be idle as a result of the delay in sending the at least one wireless reverse link packet to the access point.

25. The method of claim 1, wherein the estimated impact includes an estimate of an amount of forward link traffic that will be generated in response to the at least one wireless reverse link packet.

26. The method of claim 1, wherein the estimated impact is based on a size of the at least one wireless reverse link packet, a nature of data included in the at least one wireless reverse link packet, or a combination thereof.

27. The method of claim 1, wherein a first GET packet for an advertisement is given a lower priority than a second GET packet for content for an application running at the mobile user equipment.

28. The method of claim 1, wherein a GET packet for first content for a first application running in a background at the mobile user equipment is given a lower priority than a GET packet for an application running in the foreground at the mobile user equipment.

29. A non-transitory computer-readable medium storing computer executable code for managing air-link connections, comprising code to:
  determine, at a mobile user equipment, an estimated impact on a wireless forward link packet to be received by the user equipment from an access point caused by a delay in sending at least one wireless reverse link packet to the access point, the estimated impact including at least one of an estimate of an amount of time that the wireless forward link will be idle as a result of the delay in sending the at least one wireless reverse link packet to the access point or an estimate of an amount of forward link traffic that will be generated in response to the at least one wireless reverse link packet, wherein the estimated impact is based on a size of the at least one wireless reverse link packet, a type of the at least one wireless reverse link packet, a nature of data included in the at least one wireless reverse link packet, or any combination thereof;
  determine, at the user equipment, a priority for at least one wireless reverse link packet for transmission from the user equipment to the access point when an indicator relating to the estimated impact breaches a corresponding threshold value,
  refrain from assigning a priority to the at least one wireless reverse link packet when the indicator does not breach the corresponding threshold value,
  wherein the priority for the at least wireless one reverse link packet is based on at least the estimated impact on a wireless forward link packet to be received by the user equipment from the access point caused by a delay in sending the at least one wireless reverse link packet to the access point; and
  transmit the at least one wireless reverse link packet to the access point based on at least the determined priority for the at least one wireless reverse link packet.

30. The computer-readable medium of claim 29, wherein the indicator comprises an indicator of a reverse link data rate, the computer-readable medium further comprising code to:
  receive the indicator of the reverse link data rate associated with a reverse link from the user equipment to the access point, wherein the code to determine the priority for the at least one wireless reverse link packet is based at least in part on the indicator of the reverse link data rate.

31. The computer-readable medium of claim 30, further comprising code to compare the indicator of the reverse link data rate to a threshold value.

32. The computer-readable medium of claim 31, wherein the threshold value includes a lower bound, below which the user equipment can expect lower than nominal data rates on the reverse link to the access point.

33. The computer-readable medium of claim 31, wherein the threshold value is an upper bound, above which the user equipment can expect lower than nominal data rates on the reverse link to the access point.

34. The computer-readable medium of claim 31, further comprising code to sort the at least one wireless reverse link packet when the indicator of the wireless reverse link data rate meets the threshold value such that the user equipment expects lower than nominal data rate on the reverse link.

35. The computer-readable medium of claim 30, wherein the at least one wireless reverse link packet comprises a transmission control protocol (TCP) ACK message, and wherein the wireless forward link packet comprises a TCP message generated in response to receiving the TCP ACK message.

36. The computer-readable medium of claim 29, further comprising code to determine a size of the at least one wireless reverse link packet and a type of data included in the packet.

37. The computer-readable medium of claim 29, wherein the code to determine the priority for the at least one wireless reverse link packet further comprises code to:
  determine a length of the at least one wireless reverse link packet; and
  prioritize the at least one wireless reverse packet based at least on the determined length of the at least one wireless reverse link packet.

38. The computer-readable medium of claim 37, wherein the code to prioritize the at least one wireless reverse link packet based at least on the determined length of the at least one wireless reverse link packet includes code to weight the at least one wireless reverse link packet that is below a particular length threshold.

39. The computer-readable medium of claim 29, wherein the code to determine the priority for the at least one wireless reverse link packet further comprises code to:
  determine a type of that at least one packet; and
  prioritize the at least one wireless reverse link packet based at least on the determined type of the at least one wireless reverse link packet.

40. The computer-readable medium of claim 39, wherein the code to prioritize the at least one wireless reverse link packet based at least on the determined type of the at least one wireless reverse link packet includes code to weight particular types of the at least one wireless reverse link packet.

41. The computer-readable medium of claim 29, wherein the code to determine the priority for the at least one wireless reverse link packet further comprises code to:
  perform deep packet inspection of data included in the at least one wireless reverse packet; and
  prioritize the at least one wireless reverse link packet based at least on the deep packet inspection of the data included in the at least one wireless reverse link packet.

42. The computer-readable medium of claim 41, wherein the code to prioritize the at least one wireless reverse link packet based on at least the deep packet inspection of the data included in the at least one wireless reverse link packet further comprises code to weight particular types of data.

43. The computer-readable medium of claim 42, wherein the at least one wireless reverse link packet associated with a GET message for requesting advertising information in the wireless forward link packet is given a low priority.

44. The computer-readable medium of claim 43, wherein ACK messages for acknowledging a forward link transmission are given a higher priority than GET messages.

45. The computer-readable medium of claim 42, wherein the at least one wireless reverse link packet associated with a domain name system (DNS) query packet is given a relatively high priority.

46. The computer-readable medium of claim 29, wherein the code to determine the priority for the at least one wireless reverse link packet further comprises code to:
  determine whether the at least one wireless reverse link packet is related to a foreground application or a background application; and
  prioritize the at least one wireless reverse link packet based at least on whether the at least one wireless reverse link packet is related to the foreground application or the background application.

47. The computer-readable medium of claim 46, wherein the code to determine whether the packet is related to the foreground application or the background application is based at least in part on information from an operating system managing applications on the user equipment.

48. The computer-readable medium of claim 29, further comprising code to:
  sort the at least one wireless reverse link packet into respective queues for corresponding priority levels;
  set at least one frequency of service value for each priority level; and
  service the respective queues based at least on the corresponding frequency of service value for the respective priority level.

49. The computer-readable medium of claim 48, wherein the at least one frequency of service value is based on a particular priority level and an indicator of a reverse link data rate.

50. The computer-readable medium of claim 48, wherein the priority levels are ranked based at least on one of the estimated amount of time that the forward link will be idle or the estimated likelihood that the forward link will be idle.

51. An apparatus comprising:
  means for determining, at a mobile user equipment, an estimated impact on a wireless forward link packet to be received by the user equipment from an access point caused by a delay in sending at least one wireless reverse link packet to the access point, the estimated impact including at least one of an estimate of an amount of time that the wireless forward link will be idle as a result of the delay in sending the at least one wireless reverse link packet to the access point or an estimate of an amount of forward link traffic that will be generated in response to the at least one wireless reverse link packet, wherein the estimated impact is based on a size of the at least one wireless reverse link packet, a type of the at least one wireless reverse link packet, a nature of data included in the at least one wireless reverse link packet, or any combination thereof;
  means for determining, at the user equipment, a priority for at least one wireless reverse link packet for transmission from the apparatus to the access point when an indicator relating to the estimated impact breaches a corresponding threshold value and refraining from assigning a priority to the at least one wireless reverse link packet when the indicator does not breach the corresponding threshold value,
  wherein the priority for the at least one wireless reverse link packet is based on at least the estimated impact on a wireless forward link packet to be received by the user equipment from the access point caused by a delay in sending the at least one wireless reverse link packet to the access point; and
  means for transmitting the at least one wireless reverse link packet to the access point based on at least the determined priority for the at least one wireless reverse link packet.

52. The apparatus of claim 51, wherein the indicator comprises an indicator of a reverse link data rate, the apparatus further comprising:
  means for receiving the indicator of the reverse link data rate associated with a reverse link from the user equipment to the access point, wherein means for determining the priority for the at least one reverse link packet is based at least in part on the indicator of the reverse link data rate.

53. The apparatus of claim 52, further comprising means for comparing the indicator of the reverse link data rate to a threshold value.

54. The apparatus of claim 53, wherein the threshold value includes a lower bound, below which the user equipment can expect lower than nominal data rates on the reverse link to the access point.

55. The apparatus of claim 53, wherein the threshold value is an upper bound, above which the user equipment can expect lower than nominal data rates on the reverse link to the access point.

56. The apparatus of claim 53, further comprising means for sorting the at least one wireless reverse link packet when the indicator of the reverse link data rate meets the threshold value such that the user equipment expects lower than nominal data rate on the reverse link.

57. The apparatus of claim 51, further comprising means for determining a size of the at least one wireless reverse link packet and a type of data included in the at least one wireless reverse link packet.

58. The apparatus of claim 51, wherein said means for determining the priority for the at least one wireless reverse link packet is configured to:
determine a length of the at least one wireless reverse link packet; and
prioritize the at least one wireless reverse link packet based at least on the determined length of the at least one wireless reverse link packet.

59. The apparatus of claim 58, wherein said means for prioritizing the at least one wireless reverse link packet based at least on the determined length of the at least one wireless reverse link packet is configured to weight the at least one wireless reverse link packet that is below a particular length threshold.

60. The apparatus of claim 51, wherein said means for determining the priority for the at least one wireless reverse link packet is configured to:
determine a type of the at least one wireless reverse link packet; and
prioritize the at least one wireless reverse link packet based at least on the determined type of the at least one wireless reverse link packet.

61. The apparatus of claim 60, wherein said means for prioritizing the at least one wireless reverse link packet based at least on the determined type of the at least one wireless reverse link packet is configured to weight particular types of the at least one wireless reverse link packet.

62. The apparatus of claim 51, wherein said means for determining the priority for the at least one wireless reverse link packet is configured to:
perform deep packet inspection of data included in the at least one wireless reverse link packet; and
prioritize the at least one wireless reverse link packet based at least on the deep packet inspection of the data included in the at least one wireless reverse link packet.

63. The apparatus of claim 62, wherein said means for prioritizing the at least one wireless reverse link packet based at least on the deep packet inspection of the data included in the at least one wireless reverse link packet is configured to weight particular types of data.

64. The apparatus of claim 63, wherein the at least one wireless reverse link packet associated with a GET message for requesting advertising information in the wireless forward link packet is given a low priority.

65. The apparatus of claim 64, wherein ACK messages for acknowledging a forward link transmission are given a higher priority than GET messages.

66. The apparatus of claim 63, wherein the at least one wireless reverse link packet associated with a domain name system (DNS) query packet is given a relatively high priority.

67. The apparatus of claim 51, wherein said means for determining the priority for the at least one wireless reverse link packet is configured to:
determine whether the at least one wireless reverse link packet is related to a foreground application or a background application; and
prioritize the at least one wireless reverse link packet based at least on whether the at least one wireless reverse link packet is related to the foreground application or the background application.

68. The apparatus of claim 67, wherein said means for determining whether the at least one wireless reverse link packet is related to the foreground application or the background application is based at least in part on information from an operating system managing applications on an the user equipment.

69. The apparatus of claim 51, further comprising:
means for sorting the at least one wireless reverse link packet into respective queues for corresponding priority levels;
means for setting at least one frequency of service value for each priority level; and
means for servicing the respective queues based at least on the corresponding frequency of service value for the respective priority level.

70. The apparatus of claim 69, wherein the at least one frequency of service value is based on a particular priority level and an indicator of a reverse link data rate.

71. The apparatus of claim 69, wherein the priority levels are ranked based at least on one of the estimated amount of time that the forward link will be idle or the estimated likelihood that the forward link will be idle.

72. The apparatus of claim 51, wherein the at least one wireless reverse link packet comprises a transmission control protocol (TCP) ACK message, and wherein the wireless forward link packet comprises a TCP message generated in response to receiving the TCP ACK message.

73. An apparatus for wireless communication, comprising:
a memory; and
at least one processor coupled to the memory and configured to:
determine, at a mobile user equipment, an estimated impact on a wireless forward link packet to be received by the user equipment from an access point caused by a delay in sending at least one wireless reverse link packet to the access point, the estimated impact including at least one of an estimate of an amount of time that the wireless forward link will be idle as a result of the delay in sending the at least one wireless reverse link packet to the access point or an estimate of an amount of forward link traffic that will be generated in response to the at least one wireless reverse link packet, wherein the estimated impact is based on a size of the at least one wireless reverse link packet, a type of the at least one wireless reverse link packet, a nature of data included in the at least one wireless reverse link packet, or any combination thereof;
determine, at the user equipment, a priority for at least one wireless reverse link packet for transmission from a user equipment to the access point when an indicator relating to the estimated impact breaches a corresponding threshold value;
refrain from assigning a priority to the at least one wireless reverse link packet when the indicator does not breach the corresponding threshold value,
wherein the priority for the at least one wireless reverse link packet is based on at least the estimated impact on a wireless forward link packet to be received by the user equipment from the access point caused by a delay in sending the at least one wireless reverse link packet to the access point, and
transmit the at least one wireless reverse link packet based on at least the determined priority for the at least one wireless reverse link packet.

74. The apparatus of claim 73, wherein the indicator comprises an indicator of a reverse link data rate, wherein the at least one processor is further configured to:
receive the indicator of the reverse link data rate associated with a reverse link from the user equipment to the access point, wherein the configuration to determine the priority for the at least one wireless reverse link packet is based at least in part on the indicator of the reverse link data rate.

75. The apparatus of claim 74, wherein the at least one processor is further configured to compare the indicator of the reverse link data rate to a threshold value.

76. The apparatus of claim 75, wherein the threshold value includes a lower bound, below which the user equipment can expect lower than nominal data rates on the reverse link to the access point.

77. The apparatus of claim 75, wherein the threshold value is an upper bound, above which the user equipment can expect lower than nominal data rates on the reverse link to the access point.

78. The apparatus of claim 75, wherein the at least one processor is further configured to sort the at least one wireless reverse link packet when the indicator of the reverse link data rate meets the threshold value such that the user equipment expects lower than nominal data rate on the reverse link.

79. The apparatus of claim 73, wherein the at least one processor is further configured to determine a size of the at least one wireless reverse link packet and a type of data included in the at least one wireless reverse link packet.

80. The apparatus of claim 73, wherein in order to determine the priority for the at least one wireless reverse link packet, the at least one processor is further configured to:
determine a length of the at least one wireless reverse link packet; and
prioritize the at least one wireless reverse link packet based at least on the determined length of the at least one wireless reverse link packet.

81. The apparatus of claim 80, wherein in order to prioritize the at least one wireless reverse link packet based at least on the determined length of the at least one wireless reverse link packet, the at least one processor is further configured to weight the at least one wireless reverse link packet that is below a particular length threshold.

82. The apparatus of claim 73, wherein in order to determine the priority for the at least one wireless reverse link packet, the at least one processor is further configured to:
determine a type of the at least one wireless reverse link packet; and
prioritize the at least one wireless reverse link packet based at least on the determined type of the at least one wireless reverse link packet.

83. The apparatus of claim 82, wherein in order to prioritize the at least one wireless reverse link packet based at least on the determined type of the at least one wireless reverse link packet, the at least one processor is further configured to weight particular types of the at least one wireless reverse link packet.

84. The apparatus of claim 73, wherein in order to determine the priority for the at least one wireless reverse link packet, the at least one processor is further configured to:
perform deep packet inspection of data included in the at least one wireless reverse link packet; and
prioritize the at least one wireless reverse link packet based at least on the deep packet inspection of the data included in the at least one wireless reverse link packet.

85. The apparatus of claim 84, wherein in order to prioritize the at least one wireless reverse link packet based at least on the deep packet inspection of the data included in the at least one wireless reverse link packet, the at least one processor is further configured to weight particular types of data.

86. The apparatus of claim 85, wherein the at least one reverse link packet associated with a GET message for requesting advertising information in the forward link packet is given a low priority.

87. The apparatus of claim 86, wherein ACK messages for acknowledging a forward link transmission are given a higher priority than GET messages.

88. The apparatus of claim 85, wherein the at least one reverse link packet associated with a domain name system (DNS) query packet is given a relatively high priority.

89. The apparatus of claim 73, wherein in order to determine the priority for the at least one wireless reverse link packet, the at least one processor is further configured to:
determine whether the at least one wireless reverse link packet is related to a foreground application or a background application; and
prioritize the at least one wireless reverse link packet based at least on whether the at least one wireless reverse link packet is related to the foreground application or the background application.

90. The apparatus of claim 89, wherein determining whether the at least one wireless reverse link packet is related to the foreground application or the background application is based at least in part on information from an operating system managing applications on the user equipment.

91. The apparatus of claim 73, wherein the at least one processor is further configured to:
sort the at least one wireless reverse link packet into respective queues for corresponding priority levels;
set at least one frequency of service value for each priority level; and
service the respective queues based at least on the corresponding frequency of service value for the respective priority level.

92. The apparatus of claim 91, wherein the at least one frequency of service value is based on a particular priority level and an indicator of a reverse link data rate.

93. The apparatus of claim 91, wherein the priority levels are ranked based at least on one of the estimated amount of time that the forward link will be idle or the estimated likelihood that the forward link will be idle.

94. The apparatus of claim 73, wherein the at least one wireless reverse link packet comprises a transmission control protocol (TCP) ACK message, and wherein the wireless forward link packet comprises a TCP message generated in response to receiving the TCP ACK message.

* * * * *